(12) United States Patent
Anagawa et al.

(10) Patent No.: US 10,871,381 B2
(45) Date of Patent: Dec. 22, 2020

(54) ANGLE SENSOR AND ANGLE SENSOR SYSTEM

(71) Applicant: TDK CORPORATION, Tokyo (JP)

(72) Inventors: Kenkichi Anagawa, Tokyo (JP);
Shinichirou Mochizuki, Tokyo (JP);
Hiraku Hirabayashi, Tokyo (JP);
Kazuya Watanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 313 days.

(21) Appl. No.: 15/805,666

(22) Filed: Nov. 7, 2017

(65) Prior Publication Data
US 2018/0164127 A1    Jun. 14, 2018

(30) Foreign Application Priority Data

Dec. 9, 2016  (JP) ................................ 2016-239055
Jun. 23, 2017 (JP) ................................ 2017-122772

(51) Int. Cl.
*G01D 5/12* (2006.01)
*G01D 3/036* (2006.01)
*G01D 5/14* (2006.01)

(52) U.S. Cl.
CPC ............. *G01D 5/12* (2013.01); *G01D 3/036* (2013.01); *G01D 5/145* (2013.01)

(58) Field of Classification Search
CPC .......... G01B 7/003; G01B 7/30; G01D 5/145; G01D 5/147; G01D 5/165; G01D 5/12; G01D 5/24476; G01R 33/02; G01R 33/025; G01R 33/09; G01R 33/093

USPC .......................... 324/207.12, 207.13, 207.25
See application file for complete search history.

(56) References Cited

U.S. PATENT DOCUMENTS

| | | | | |
|---|---|---|---|---|
| 4,673,827 A | * | 6/1987 | Sommer | ............. F15B 15/2807 307/116 |
| 4,893,027 A | * | 1/1990 | Kammerer | ......... H03K 17/9517 307/116 |
| 7,288,931 B2 | * | 10/2007 | Granig | .................... H03M 1/06 324/202 |
| 8,604,780 B2 | | 12/2013 | Saruki et al. | |
| 8,659,289 B2 | | 2/2014 | Saruki et al. | |
| 2009/0315547 A1 | * | 12/2009 | Abwa | .................... G01R 33/02 324/244 |

(Continued)

FOREIGN PATENT DOCUMENTS

JP       2002-148009 A      5/2002

*Primary Examiner* — Steven L Yeninas
(74) *Attorney, Agent, or Firm* — Oliff PLC

(57) ABSTRACT

An angle sensor includes a plurality of composite magnetic field information generation units and an angle computing unit. The plurality of composite magnetic field information generation units detect, at a plurality of detection positions, a composite magnetic field of a magnetic field to be detected and a noise magnetic field other than the magnetic field to be detected, and thereby generate a plurality of pieces of composite magnetic field information including information on at least the direction, out of the direction and the strength, of the composite magnetic field. At each of the plurality of detection positions, the magnetic field to be detected varies in direction according to an angle to be detected. The angle computing unit generates a detected angle value using the method of least squares on the basis of the plurality of pieces of composite magnetic field information.

17 Claims, 17 Drawing Sheets

(56) References Cited

U.S. PATENT DOCUMENTS

| | | | | |
|---|---|---|---|---|
| 2012/0038351 A1* | 2/2012 | Saruki | ............... | G01R 33/091 |
| | | | | 324/207.25 |
| 2012/0038359 A1* | 2/2012 | Saruki | ................ | B82Y 25/00 |
| | | | | 324/252 |
| 2014/0285188 A1* | 9/2014 | Kuwano | .............. | G01R 33/09 |
| | | | | 324/252 |
| 2015/0025761 A1* | 1/2015 | Kernebeck | ............ | G01D 5/145 |
| | | | | 701/60 |
| 2017/0097224 A1* | 4/2017 | Lucas | ..................... | G01B 7/30 |
| 2018/0087888 A1* | 3/2018 | Ausserlechner | ......... | G01B 7/30 |
| 2018/0087889 A1* | 3/2018 | Ausserlechner | ..... | G01R 33/093 |

* cited by examiner

ANGLE SENSOR AND ANGLE SENSOR SYSTEM

BACKGROUND OF THE INVENTION

1. Field of the Invention

The present invention relates to an angle sensor and an angle sensor system for generating a detected angle value having a correspondence with an angle to be detected.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. An angle sensor system using a magnetic angle sensor is typically provided with a magnetic field generation unit for generating a magnetic field to be detected, the direction of which rotates in response to the rotation or linear movement of an object. The magnetic field generation unit is a magnet, for example. The angle to be detected by the magnetic angle sensor has a correspondence with an angle that the direction of the magnetic field to be detected at a reference position forms with respect to a reference direction.

Among known magnetic angle sensors is one that includes a plurality of detection circuits for generating a plurality of detection signals of different phases and generates a detected angle value by performing an operation using the plurality of detection signals, as disclosed in U.S. Pat. Nos. 8,604,780 B2 and 8,659,289 B2. Each of the plurality of detection circuits detects a magnetic field to be detected. Each of the plurality of detection circuits includes at least one magnetic detection element.

In some magnetic angle sensors, as described in U.S. Pat. Nos. 8,604,780 B2 and 8,659,289 B2, each detection circuit may be subjected to not only a magnetic field to be detected but also a noise magnetic field other than the magnetic field to be detected. Examples of the noise magnetic field include the earth's magnetic field and a leakage magnetic field from a motor. When subjected to such a noise magnetic field, each detection circuit detects a composite magnetic field of the magnetic field to be detected and the noise magnetic field. When the magnetic field to be detected and the noise magnetic field are in different directions, some error occurs in the detected angle value. The error occurring in the detected angle value will hereinafter be referred to as angular error.

U.S. Pat. Nos. 8,604,780 B2 and 8,659,289 B2 describe rotating field sensors that are capable of reducing an angular error caused by a noise magnetic field. Each of the rotating field sensors described in U.S. Pat. Nos. 8,604,780 B2 and 8,659,289 B2 is provided with a magnetic field generation unit for generating a rotating magnetic field, and a first and a second detection unit. The rotating magnetic field includes a first partial magnetic field present at a first position and a second partial magnetic field present at a second position. The directions of the first partial magnetic field and the second partial magnetic field are different from each other by 180° and rotate in the same rotational direction. The first detection unit is configured to detect, at the first position, a composite magnetic field of the first partial magnetic field and a noise magnetic field. The second detection unit is configured to detect, at the second position, a composite magnetic field of the second partial magnetic field and the noise magnetic field. The rotating field sensors described in U.S. Pat. Nos. 8,604,780 B2 and 8,659,289 B2 perform operations using the outputs from the first and second detection units to thereby generate a detected angle value in which the angular error caused by the noise magnetic field is reduced.

The rotating field sensors described in U.S. Pat. Nos. 8,604,780 B2 and 8,659,289 B2 each require the particular magnetic field generation unit for generating a rotating magnetic field that includes the first and second partial magnetic fields defined as above. Furthermore, locations of the first and second detection units are limited depending on the pattern of the rotating magnetic field. These rotating field sensors thus have substantial limitations with respect to structure and installation.

SUMMARY OF THE INVENTION

It is an object of the present invention to provide an angle sensor and an angle sensor system that enable reduction of an angular error caused by a noise magnetic field, without introducing any substantial limitations with respect to structure or installation.

An angle sensor of the present invention is configured to generate a detected angle value having a correspondence with an angle to be detected. The angle sensor of the present invention includes a plurality of composite magnetic field information generation units, and an angle computing unit. The plurality of composite magnetic field information generation units are configured to detect, at a plurality of detection positions different from each other, a composite magnetic field of a magnetic field to be detected and a noise magnetic field other than the magnetic field to be detected, and to thereby generate a plurality of pieces of composite magnetic field information including information on at least the direction, out of the direction and the strength, of the composite magnetic field. The angle computing unit is configured to generate the detected angle value.

At each of the plurality of detection positions, the magnetic field to be detected varies in direction according to the angle to be detected. The angle computing unit generates the detected angle value using the method of least squares on the basis of the plurality of pieces of composite magnetic field information.

In the angle sensor of the present invention, each of the plurality of composite magnetic field information generation units may include two detection signal generation units for generating two detection signals indicative of the strengths of two components of the composite magnetic field that are in mutually different directions. Each of the plurality of pieces of composite magnetic field information may be generated on the basis of the two detection signals. The two components of the composite magnetic field may be in mutually orthogonal directions. Each of the two detection signal generation units may include at least one magnetic detection element.

In the angle sensor of the present invention, each of the plurality of pieces of composite magnetic field information may include information on the direction and strength of the composite magnetic field. In such a case, the angle computing unit may determine a first estimated value and a second estimated value so as to minimize the sum of squares of differences between respective corresponding ones of the plurality of pieces of composite magnetic field information and a plurality of pieces of estimated composite magnetic field information, and may determine the detected angle value on the basis of the first estimated value. The first estimated value includes direction information corresponding to the detected angle value, and magnitude information corresponding to the strength of the magnetic field to be detected at a predetermined position. The second estimated value includes direction information corresponding to the direction of the noise magnetic field, and magnitude information corresponding to the strength of the noise magnetic field. The plurality of pieces of estimated composite magnetic field information are estimated information of the plurality of pieces of composite magnetic field information, and are generated on the basis of the first and second estimated values.

In the angle sensor of the present invention, the magnetic field to be detected may have different strengths at the plurality of detection positions. Alternatively, the variation in direction of the magnetic field to be detected according to the angle to be detected may exhibit different patterns at the plurality of detection positions.

In the angle sensor of the present invention, each of the plurality of pieces of composite magnetic field information may include information on the direction of the composite magnetic field. In such a case, the angle computing unit may assume a first unknown, a second unknown, and a plurality of pieces of assumed magnetic field information. The first unknown is a value corresponding to the detected angle value. The second unknown is a value corresponding to the strength of the noise magnetic field. The plurality of pieces of assumed magnetic field information are information corresponding to the plurality of pieces of composite magnetic field information and assumed on the basis of the first and second unknowns. The angle computing unit may further estimate the first and second unknowns so as to minimize the sum of squares of differences between respective corresponding ones of the plurality of pieces of composite magnetic field information and the plurality of pieces of assumed magnetic field information, and may determine the detected angle value on the basis of the estimated first unknown.

In the angle sensor of the present invention, when each of the plurality of pieces of composite magnetic field information includes the information on the direction of the composite magnetic field, each of the plurality of composite magnetic field information generation units may include: a first signal generation unit for generating a first signal having a correspondence with the cosine of an angle that the direction of the composite magnetic field forms with respect to a reference direction; a second signal having a correspondence with the sine of the angle that the direction of the composite magnetic field forms with respect to the reference direction; and an individual angle computing unit for generating, on the basis of the first and second signals, an individual angle value as the composite magnetic field information, the individual angle value representing the angle that the direction of the composite magnetic field forms with respect to the reference direction. Each of the first and second signal generation units may include at least one magnetic detection element.

In the angle sensor of the present invention, when each of the plurality of pieces of composite magnetic field information includes the information on the direction of the composite magnetic field, the magnetic field to be detected may have different strengths at least two of the plurality of detection positions.

An angle sensor system of the present invention includes the angle sensor of the present invention and a magnetic field generation unit for generating the magnetic field to be detected.

In the angle sensor system of the present invention, the plurality of detection positions may be at different distances from the magnetic field generation unit, and the magnetic field to be detected may have different strengths at the plurality of detection positions. In such a case, the plurality of detection positions may be mutually different positions on an imaginary straight line passing through the magnetic field generation unit.

In the angle sensor system of the present invention, the plurality of detection positions may be in one plane. In such a case, the variation in direction of the magnetic field to be detected according to the angle to be detected may exhibit different patterns at the plurality of detection positions. Alternatively, the magnetic field to be detected may have different strengths at at least two of the plurality of detection positions.

According to the angle sensor and the angle sensor system of the present invention, the detected angle value is generated using the method of least squares on the basis of the plurality of pieces of composite magnetic field information generated by the plurality of composite magnetic field information generation units. By virtue of this, the present invention enables reduction of an angular error caused by a noise magnetic field, without introducing any substantial limitations with respect to the structure or installation of the angle sensor or the angle sensor system.

Other and further objects, features and advantages of the present invention will appear more fully from the following description.

DETAILED DESCRIPTION OF THE PREFERRED EMBODIMENTS

First Embodiment

Figure 1:
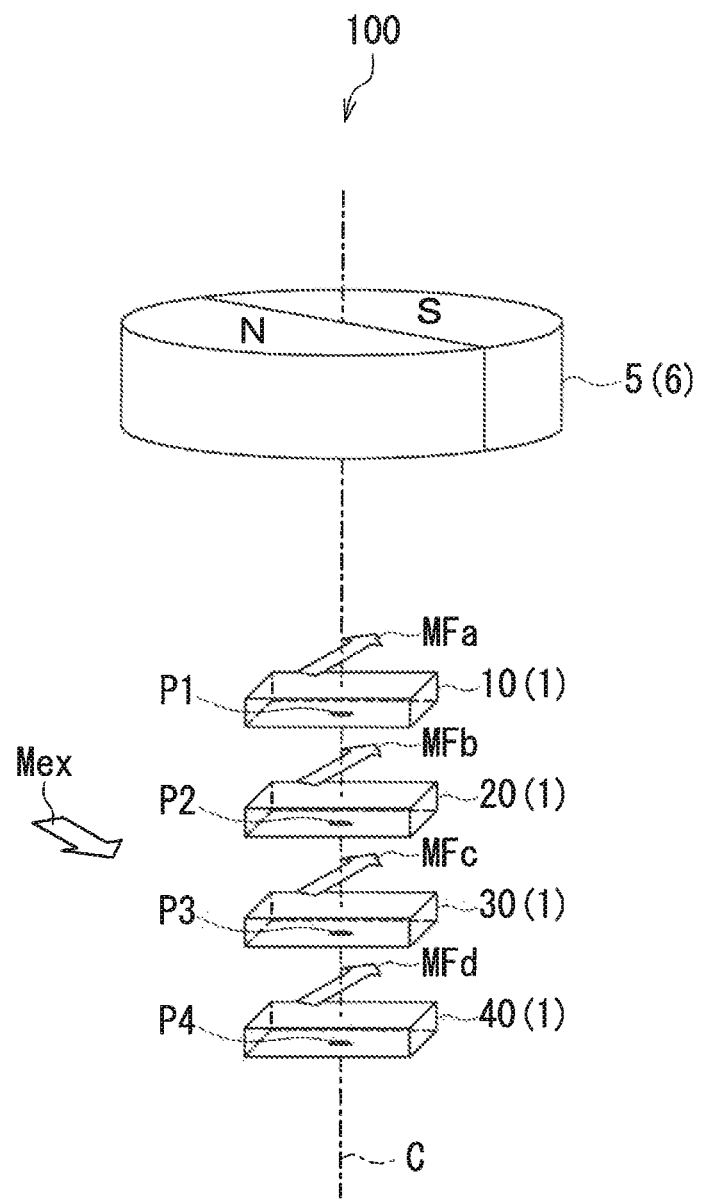
FIG. 1 is a perspective view illustrating the general configuration of an angle sensor system according to a first embodiment of the invention.

Preferred embodiments of the present invention will now be described in detail with reference to the drawings. First, reference is made to FIG. 1 to describe the general configuration of an angle sensor system according to a first embodiment of the invention. The angle sensor system 100 according to the first embodiment includes an angle sensor 1 according to the first embodiment and a magnetic field generation unit 5. The angle sensor 1 is a magnetic angle sensor, in particular. The magnetic field generation unit 5 generates a magnetic field to be detected by the angle sensor 1. Hereinafter, the magnetic field to be detected by the angle sensor 1 will be referred to as target magnetic field.

The magnetic field generation unit 5 of the present embodiment is a magnet 6 of a cylindrical shape. The magnet 6 has an N pole and an S pole that are arranged symmetrically with respect to an imaginary plane including the central axis of the cylindrical shape. The magnet 6 rotates about the central axis of the cylindrical shape. Consequently, the direction of the target magnetic field generated by the magnet 6 rotates about a center of rotation C including the central axis of the cylindrical shape.

The angle sensor 1 is configured to generate a detected angle value $\theta s$ having a correspondence with an angle to be detected. In the present embodiment, the angle to be detected has a correspondence with an angle that the direction of the target magnetic field at a reference position forms with respect to a reference direction. Hereinafter, the angle that the direction of the target magnetic field at the reference position forms with respect to the reference direction will be referred to as rotating field angle, and denoted by the symbol $\theta M$.

The reference position is located within a reference plane. As used herein, the reference plane refers to an imaginary plane parallel to an end face of the magnet 6. In the reference plane, the direction of the target magnetic field generated by the magnet 6 rotates about the reference position. The reference direction is located within the reference plane and intersects the reference position. In the following description, the direction of the target magnetic field at the reference position refers to a direction located within the reference plane.

The angle sensor 1 includes a plurality of composite magnetic field information generation units. The plurality of composite magnetic field information generation units detect a composite magnetic field of the target magnetic field and a noise magnetic field other than the target magnetic field at a plurality of detection positions different from each other, and thereby generate a plurality of pieces of composite magnetic field information including information on at least the direction, out of the direction and the strength, of the composite magnetic field. At each of the plurality of detection positions, the direction of the target magnetic field varies according to the angle to be detected and the rotating field angle $\theta M$. In the present embodiment, the plurality of detection positions are located at different distances from the magnetic field generation unit 5. The target magnetic field has different strengths at the plurality of detection positions.

The number of the plurality of detection positions is at least two. In the following description, the plurality of detection positions include a first detection position P1, a second detection position P2, a third detection position P3, and a fourth detection position P4. In this case, the plurality of pieces of composite magnetic field information include first composite magnetic field information, second composite magnetic field information, third composite magnetic field information, and fourth composite magnetic field information. The plurality of composite magnetic field information generation units include a first composite magnetic field information generation unit 10, a second composite magnetic field information generation unit 20, a third composite magnetic field information generation unit 30, and a fourth composite magnetic field information generation unit 40. The first to fourth composite magnetic field information generation units 10, 20, 30 and 40 are placed to face one end face of the magnet 6.

The first to fourth detection positions P1 to P4 may be mutually different positions on an imaginary straight line passing through the magnetic field generation unit 5. The imaginary straight line may or may not coincide with the center of rotation C. FIG. 1 illustrates the former case. In this example, the first to fourth detection positions P1, P2, P3 and P4 are arranged in this order in the direction away from the magnetic field generation unit 5. Note that it is not necessarily required that all of the first to fourth detection positions P1 to P4 be collinear.

The first composite magnetic field information generation unit 10 detects a composite magnetic field of the target magnetic field and a noise magnetic field at the first detection position P1 to thereby generate the first composite magnetic field information. The second composite magnetic field information generation unit 20 detects the composite magnetic field of the target magnetic field and the noise magnetic field at the second detection position P2 to thereby generate the second composite magnetic field information. The third composite magnetic field information generation unit 30 detects the composite magnetic field of the target magnetic field and the noise magnetic field at the third detection position P3 to thereby generate the third composite magnetic field information. The fourth composite magnetic field information generation unit 30 detects the composite magnetic field of the target magnetic field and the noise magnetic field at the fourth detection position P4 to thereby generate the fourth composite magnetic field information.

Hereinafter, the target magnetic field at the first detection position P1 will be referred to as the first partial magnetic field MFa, the target magnetic field at the second detection position P2 will be referred to as the second partial magnetic field MFb, the target magnetic field at the third detection position P3 will be referred to as the third partial magnetic field MFc, and the target magnetic field at the fourth detection position P4 will be referred to as the fourth partial magnetic field MFd. The directions of the first to fourth partial magnetic fields MFa to MFd vary according to the angle to be detected and the rotating field angle θM. The first to fourth partial magnetic fields MFa to MFd have different strengths.

In the present embodiment, as described below, each of the plurality of pieces of composite magnetic field information includes information on the direction and strength of the composite magnetic field. The first composite magnetic field information includes information on the direction and strength of the composite magnetic field at the first detection position P1. The second composite magnetic field information includes information on the direction and strength of the composite magnetic field at the second detection position P2. The third composite magnetic field information includes information on the direction and strength of the composite magnetic field at the third detection position P3. The fourth composite magnetic field information includes information on the direction and strength of the composite magnetic field at the fourth detection position P4. Hereinafter, the composite magnetic field at the first detection position P1 will be referred to as the first composite magnetic field MF1, the composite magnetic field at the second detection position P2 will be referred to as the second composite magnetic field MF2, the composite magnetic field at the third detection position P3 will be referred to as the third composite magnetic field MF3, and the composite magnetic field at the fourth detection position P4 will be referred to as the fourth composite magnetic field MF4.

The noise magnetic field is in the same direction at the first to fourth detection positions P1 to P4. The noise magnetic field has the same strength at the first to fourth detection positions P1 to P4. The noise magnetic field will be denoted by the symbol Mex. The noise magnetic field Mex may be a magnetic field whose direction and strength are temporally constant, a magnetic field whose direction and strength temporally vary in a periodic manner, or a magnetic field whose direction and strength temporally vary in a random fashion. The first composite magnetic field MF1 is a composite magnetic field of the first partial magnetic field MFa and the noise magnetic field Mex. The second composite magnetic field MF2 is a composite magnetic field of the second partial magnetic field MFb and the noise magnetic field Mex. The third composite magnetic field MF3 is a composite magnetic field of the third partial magnetic field MFc and the noise magnetic field Mex. The fourth composite magnetic field MF4 is a composite magnetic field of the fourth partial magnetic field MFd and the noise magnetic field Mex.

The angle sensor system 100 according to the present embodiment may have a different configuration than that shown in FIG. 1. For example, the magnetic field generation unit 5 and the first to fourth composite magnetic field information generation units 10, 20, 30 and 40 arranged as shown in FIG. 1 may be configured so that: the first to fourth composite magnetic field information generation units 10, 20, 30 and 40 rotate while the magnetic field generation unit 5 is fixed; the magnetic field generation unit 5 and the composite magnetic field information generation units 10, 20, 30, 40 rotate in mutually opposite directions; or the magnetic field generation unit 5 and the composite magnetic field information generation units 10, 20, 30, 40 rotate in the same direction with mutually different angular velocities.

Figure 2:
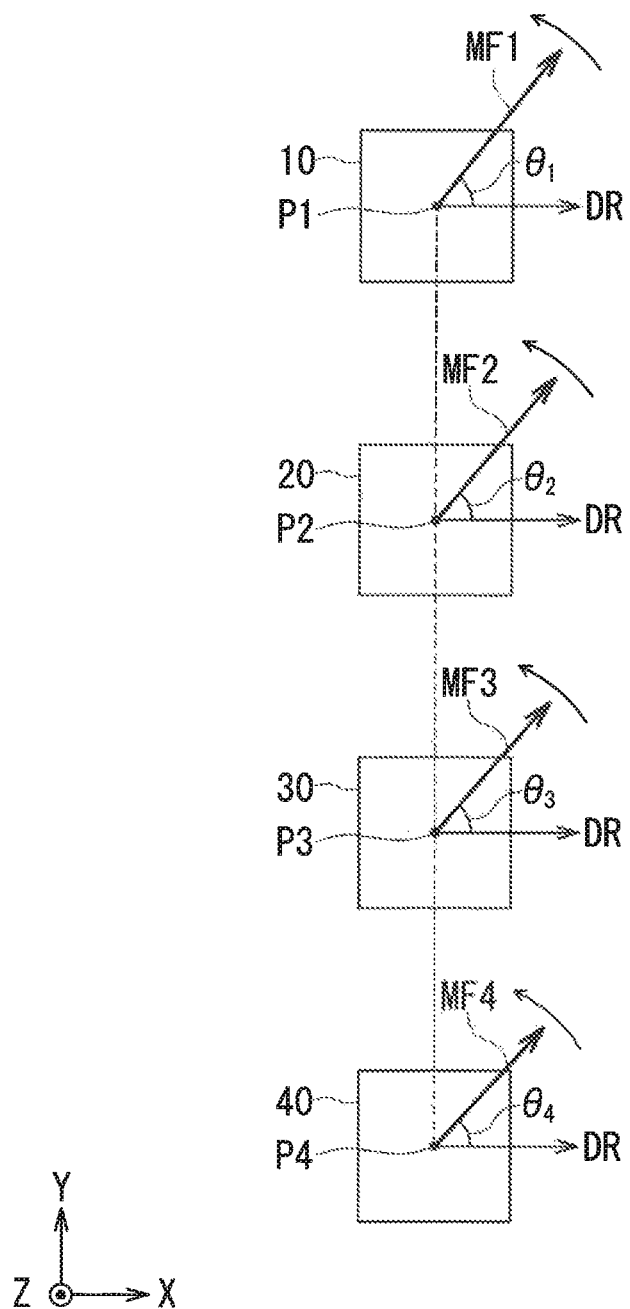
FIG. 2 is an explanatory diagram illustrating the definitions of directions and angles used in the first embodiment of the invention.

Definitions of directions and angles used in the present embodiment will now be described with reference to FIG. 1 and FIG. 2. First, Z direction is the direction parallel to the center of rotation C shown in FIG. 1 and upward in FIG. 1. FIG. 2 illustrates the Z direction as the direction out of the plane of FIG. 2. Next, X and Y directions are two directions that are perpendicular to the Z direction and orthogonal to each other. FIG. 2 illustrates the X direction as the rightward direction, and the Y direction as the upward direction. Further, −X direction is the direction opposite to the X direction, and −Y direction is the direction opposite to the Y direction.

The rotating field angle θM is expressed with respect to the reference direction DR. In the present embodiment, the X direction is the reference direction DR.

Assume that all the directions of the first to fourth composite magnetic fields MF1 to MF4 rotate counterclockwise in FIG. 2. As shown in FIG. 2, $\theta_1$ represents an angle that the direction of the first composite magnetic field MF1 forms with respect to the reference direction DR, $\theta_2$ represents an angle that the direction of the second composite magnetic field MF2 forms with respect to the reference direction DR, $\theta_3$ represents an angle that the direction of the third composite magnetic field MF3 forms with respect to the reference direction DR, and $\theta_4$ represents an angle that the direction of the fourth composite magnetic field MF4 forms with respect to the reference direction DR. The angles $\theta_1$ to $\theta_4$ are expressed in positive values when seen counterclockwise from the reference direction DR, and in negative values when seen clockwise from the reference direction DR.

The main component of the first composite magnetic field MF1 is the first partial magnetic field MFa. The main component of the second composite magnetic field MF2 is the second partial magnetic field MFb. The main component of the third composite magnetic field MF3 is the third partial magnetic field MFc. The main component of the fourth composite magnetic field MF4 is the fourth partial magnetic field MFd. The first to fourth partial magnetic fields MFa to MFd are in the same direction. The first to fourth partial magnetic fields MFa to MFd form equal angles with respect to the reference direction DR.

In the present embodiment, the direction of the first to fourth partial magnetic fields MFa to MFd coincides with the direction of the target magnetic field at the reference position. Each of the first to fourth partial magnetic fields MFa to MFd forms an angle equal to the rotating field angle θM with respect to the reference direction DR. The definitions of positive and negative of the angles are the same as those of the angles $\theta_1$ to $\theta_4$.

As long as the above-described relationship between the target magnetic field at the reference position and the first to fourth partial magnetic fields MFa to MFd is satisfied, the reference position may coincide with any of the first to fourth detection positions P1 to P4, or may be any position that lies on the center of rotation C and is different from the first to fourth detection positions P1 to P4.

As will be described in detail later, each piece of composite magnetic field information is generated on the basis of the strengths of two components of the composite magnetic field that are in mutually different directions. In the present embodiment, the two components of the composite magnetic field are in mutually orthogonal directions, that is, the X direction and the Y direction.

Figure 3:
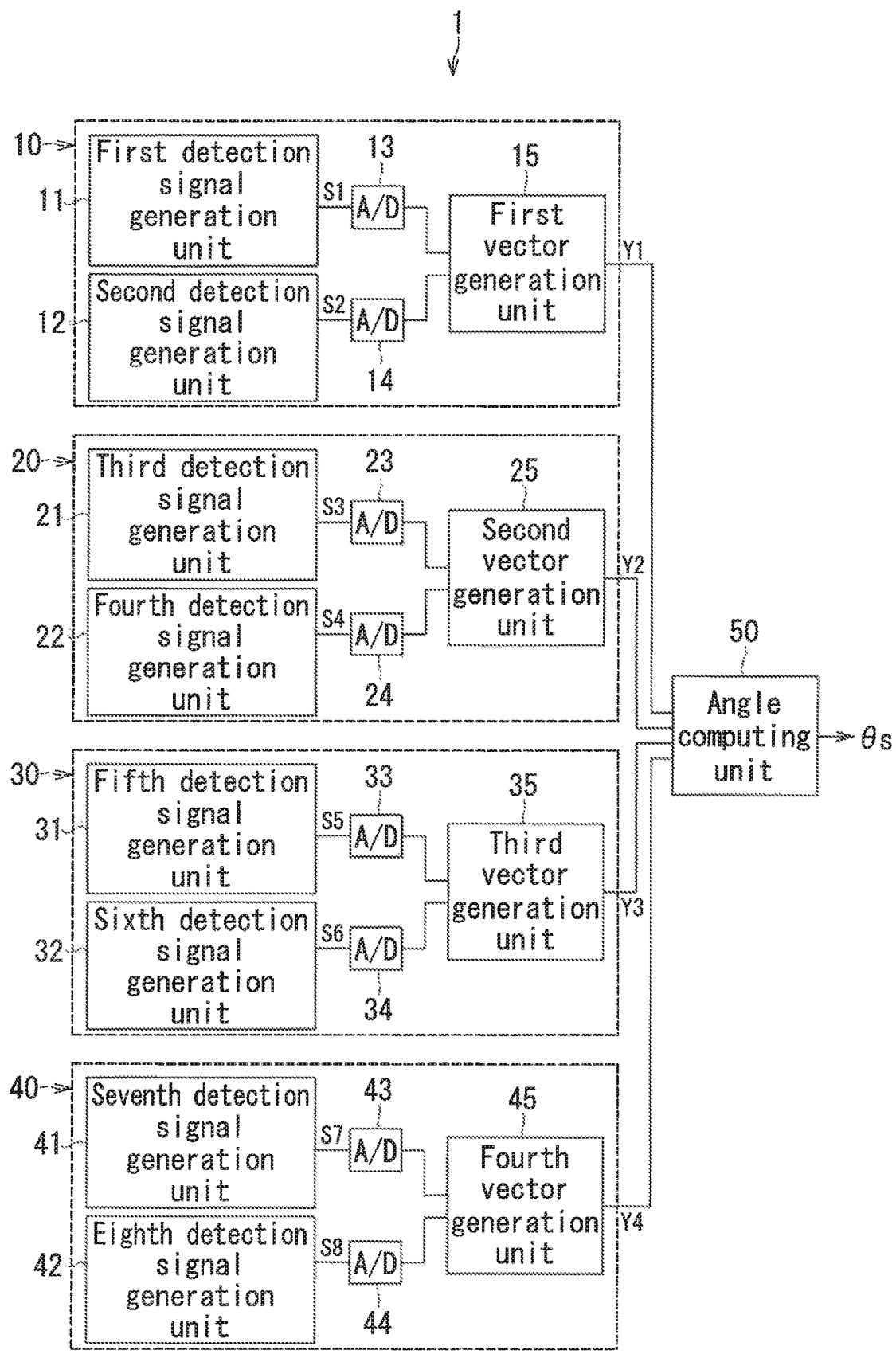
FIG. 3 is a functional block diagram illustrating the configuration of an angle sensor according to the first embodiment of the invention.

Reference is now made to FIG. 3 to describe the configuration of the angle sensor 1 in detail. FIG. 3 is a functional block diagram illustrating the configuration of the angle sensor 1. As previously mentioned, the angle sensor 1 includes a plurality of composite magnetic field information generation units. Each of the plurality of composite magnetic field information generation units includes two detection signal generation units for generating two detection signals indicative of the strengths of the two components in mutually different directions of the composite magnetic field. Each piece of composite magnetic field information is generated on the basis of the two detection signals. Each of the two detection signal generation units includes at least one magnetic detection element. The at least one magnetic detection element may include at least one magnetoresistance element. The magnetoresistance element may be a giant magnetoresistance (GMR) element, a tunneling magnetoresistance (TMR) element, or an anisotropic magnetoresistance (AMR) element. The at least one magnetic detection element may further include at least one element other than the magnetoresistance element, such as a Hall element, for detecting a magnetic field.

In the present embodiment, the plurality of composite magnetic field information generation units are the first composite magnetic field information generation unit 10, the second composite magnetic field information generation unit 20, the third composite magnetic field information generation unit 30, and the fourth composite magnetic field information generation unit 40. The first composite magnetic field information generation unit 10 includes a first detection signal generation unit 11 and a second detection signal generation unit 12. The first detection signal generation unit 11 generates a first detection signal S1 indicative of the strength of a component in the X direction (hereinafter, "X-directional component") of the first composite magnetic field MF1. The second detection signal generation unit 12 generates a second detection signal S2 indicative of the strength of a component in the Y direction (hereinafter, "Y-directional component") of the first composite magnetic field MF1.

The first composite magnetic field information is generated on the basis of the first and second detection signals S1 and S2. In the present embodiment, the first composite magnetic field information is represented as a vector including information on the direction and strength of the first composite magnetic field MF1. The first composite magnetic field information generation unit 10 further includes analog-to-digital converters (hereinafter, "A/D converters") 13 and 14, and a first vector generation unit 15. The A/D converters 13 and 14 respectively convert the first and second detection signals S1 and S2 into digital signals. The first vector generation unit 15 generates a vector Y1 representing the first composite magnetic field information, by using the first and second detection signals S1 and S2 converted into digital signals by the A/D converters 13 and 14. The first vector generation unit 15 can be implemented by an application-specific integrated circuit (ASIC), for example.

The second composite magnetic field information generation unit 20 includes a third detection signal generation unit 21 and a fourth detection signal generation unit 22. The third detection signal generation unit 21 generates a third detection signal S3 indicative of the strength of an X-directional component of the second composite magnetic field MF2. The fourth detection signal generation unit 22 generates a fourth detection signal 54 indicative of the strength of a Y-directional component of the second composite magnetic field MF2.

The second composite magnetic field information is generated on the basis of the third and fourth detection signals S3 and S4. In the present embodiment, the second composite magnetic field information is represented as a vector including information on the direction and strength of the second composite magnetic field MF2. The second composite magnetic field information generation unit 20 further includes A/D converters 23 and 24, and a second vector generation unit 25. The A/D converters 23 and 24 respectively convert the third and fourth detection signals S3 and S4 into digital signals. The second vector generation unit 25 generates a vector Y2 representing the second composite magnetic field information, by using the third and fourth detection signals S3 and S4 converted into digital signals by the A/D converters 23 and 24. The second vector generation unit 25 can be implemented by an ASIC, for example.

The third composite magnetic field information generation unit 30 includes a fifth detection signal generation unit 31 and a sixth detection signal generation unit 32. The fifth detection signal generation unit 31 generates a fifth detection signal S5 indicative of the strength of an X-directional component of the third composite magnetic field MF3. The sixth detection signal generation unit 32 generates a sixth detection signal S6 indicative of the strength of a Y-directional component of the third composite magnetic field MF3.

The third composite magnetic field information is generated on the basis of the fifth and sixth detection signals S5 and S6. In the present embodiment, the third composite magnetic field information is represented as a vector including information on the direction and strength of the third composite magnetic field MF3. The third composite magnetic field information generation unit 30 further includes A/D converters 33 and 34, and a third vector generation unit 35. The A/D converters 33 and 34 respectively convert the fifth and sixth detection signals S5 and S6 into digital signals. The third vector generation unit 35 generates a vector Y3 representing the third composite magnetic field information, by using the fifth and sixth detection signals S5 and S6 converted into digital signals by the A/D converters 33 and 34. The third vector generation unit 35 can be implemented by an ASIC, for example.

The fourth composite magnetic field information generation unit 40 includes a seventh detection signal generation unit 41 and an eighth detection signal generation unit 42. The seventh detection signal generation unit 41 generates a seventh detection signal S7 indicative of an X-directional component of the fourth composite magnetic field MF4. The eighth detection signal generation unit 42 generates an eighth detection signal S8 indicative of the strength of a Y-directional component of the fourth composite magnetic field MF4.

The fourth composite magnetic field information is generated on the basis of the seventh and eighth detection signals S7 and S8. In the present embodiment, the fourth composite magnetic field information is represented as a vector including information on the direction and strength of the fourth composite magnetic field MF4. The fourth composite magnetic field information generation unit 40 further includes A/D converters 43 and 44, and a fourth vector generation unit 45. The A/D converters 43 and 44 respectively convert the seventh and eighth detection signals S7 and S8 into digital signals. The fourth vector generation unit 45 generates a vector Y4 representing the fourth composite magnetic field information, by using the seventh and eighth detection signals S7 and S8 converted into digital signals by the A/D converters 43 and 44. The fourth vector generation unit 45 can be implemented by an ASIC, for example.

As the direction of the target magnetic field rotates with a predetermined period, the rotating field angle θM varies with the predetermined period. In this case, all the first to eighth detection signals S1 to S8 vary periodically with a signal period equal to the aforementioned predetermined period. The phase of the second detection signal S2 is different from the phase of the first detection signal S1 by an odd number of times ¼ the signal period. The third, fifth and seventh detection signals S3, S5 and S7 are in phase with the first detection signal S1. The fourth, sixth and eighth detection signals S4, S6 and S8 are in phase with the second detection signal S2. In the light of the production accuracy of the magnetic detection elements or other factors, the relationships among the phases of the detection signals may be slightly different from the above-described relationships.

The angle sensor 1 further includes an angle computing unit 50 for generating the detected angle value θs using the method of least squares on the basis of the plurality of pieces of composite magnetic field information. As mentioned previously, the plurality of detection positions are different from each other. This causes the noise magnetic field Mex to have different relative effects on the plurality of pieces of composite magnetic field information. This may result in differences dependent on the noise magnetic field Mex between the plurality of pieces of composite magnetic field information. By using this characteristic, it becomes possible to estimate the angle to be detected, with the effect of the noise magnetic field Mex eliminated. The angle computing unit 50 generates the detected angle value θs using the aforementioned characteristic. The angle computing unit 50 can be implemented by an ASIC or a microcomputer, for example. A description will be given later as to the configuration of the angle computing unit 50 and a generation method for the detected angle value θs.

Figure 5:
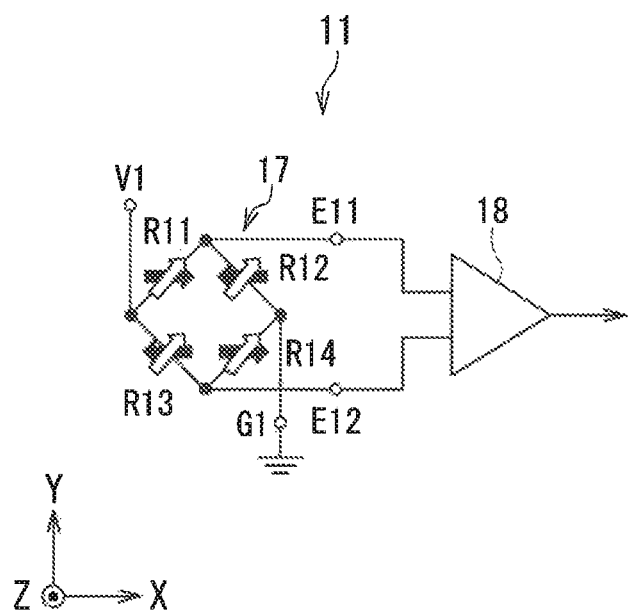
FIG. 5 is a circuit diagram illustrating an example configuration of a first detection signal generation unit of the first embodiment of the invention.

The configuration of the first to eighth detection signal generation units 11, 12, 21, 22, 31, 32, 41 and 42 will now be described. FIG. 5 illustrates an example of the specific configuration of the first detection signal generation unit 11. In this example, the first detection signal generation unit 11 includes a Wheatstone bridge circuit 17 and a difference detector 18. The Wheatstone bridge circuit 17 includes a power supply port V1, a ground port G1, two output ports E11 and E12, a first pair of serially connected magnetic detection elements R11 and R12, and a second pair of serially connected magnetic detection elements R13 and R14. One end of each of the magnetic detection elements R11 and R13 is connected to the power supply port V1. The other end of the magnetic detection element R11 is connected to one end of the magnetic detection element R12 and the output port E11. The other end of the magnetic detection element R13 is connected to one end of the magnetic detection element R14 and the output port E12. The other end of each of the magnetic detection elements R12 and R14 is connected to the ground port G1. A power supply voltage of predetermined magnitude is applied to the power supply port V1. The ground port G1 is grounded.

Each of the third, fifth and seventh detection signal generation units 21, 31 and 41 has the same configuration as the first detection signal generation unit 11. Thus, in the following description, components of the third, fifth and seventh detection signal generation units 21, 31 and 41 are denoted by the same reference signs as those used for the components of the first detection signal generation unit 11.

Figure 6:
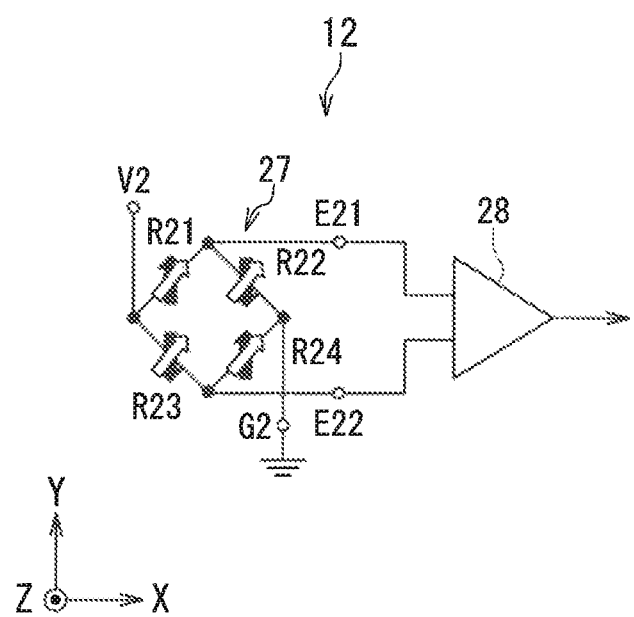
FIG. 6 is a circuit diagram illustrating an example configuration of a second detection signal generation unit of the first embodiment of the invention.

FIG. 6 illustrates an example of the specific configuration of the second detection signal generation unit 12. In this example, the second detection signal generation unit 12 includes a Wheatstone bridge circuit 27 and a difference detector 28. The Wheatstone bridge circuit 27 includes a power supply port V2, a ground port G2, two output ports E21 and E22, a first pair of serially connected magnetic detection elements R21 and R22, and a second pair of serially connected magnetic detection elements R23 and R24. One end of each of the magnetic detection elements R21 and R23 is connected to the power supply port V2. The other end of the magnetic detection element R21 is connected to one end of the magnetic detection element R22 and the output port E21. The other end of the magnetic detection element R23 is connected to one end of the magnetic detection element R24 and the output port E22. The other end of each of the magnetic detection elements R22 and R24 is connected to the ground port G2. A power supply voltage of predetermined magnitude is applied to the power supply port V2. The ground port G2 is grounded.

Each of the fourth, sixth and eighth detection signal generation units 22, 32 and 42 has the same configuration as the second detection signal generation unit 12. Thus, in the following description, components of the fourth, sixth and eighth detection signal generation units 22, 32 and 42 are denoted by the same reference signs as those used for the components of the second detection signal generation unit 12.

In the present embodiment, each of the magnetic detection elements R11 to R14 and R21 to R24 includes a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies depending on the direction of the target magnetic field, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance depending on the angle that the magnetization direction of the free layer forms with respect to the magnetization direction of the magnetization pinned layer, and has a minimum resistance when the foregoing angle is 0° and a maximum resistance when the foregoing angle is 180°. In FIG. 5 and FIG. 6, the filled arrows indicate the magnetization directions of the magnetization pinned layers of the MR elements, and the hollow arrows indicate the magnetization directions of the free layers of the MR elements.

In the first detection signal generation unit 11, the magnetization pinned layers of the MR elements included in the magnetic detection elements R11 and R14 are magnetized in the X direction, and the magnetization pinned layers of the MR elements included in the magnetic detection elements R12 and R13 are magnetized in the −X direction. In this case, the potential difference between the output ports E11 and E12 varies depending on the strength of the X-directional component of the first composite magnetic field MF1. The difference detector 18 outputs a signal corresponding to the potential difference between the output ports E11 and E12 as the first detection signal S1. Thus, the first detection signal generation unit 11 detects the strength of the X-directional component of the first composite magnetic field MF1 and generates the first detection signal S1 indicative of the strength.

In the second detection signal generation unit 12, the magnetization pinned layers of the MR elements included in the magnetic detection elements R21 and R24 are magnetized in the Y direction, and the magnetization pinned layers of the MR elements included in the magnetic detection elements R22 and R23 are magnetized in the −Y direction. In this case, the potential difference between the output ports E21 and E22 varies depending on the strength of the Y-directional component of the first composite magnetic field MF1. The difference detector 28 outputs a signal corresponding to the potential difference between the output ports E21 and E22 as the second detection signal S2. Thus, the second detection signal generation unit 12 detects the strength of the Y-directional component of the first composite magnetic field MF1 and generates the second detection signal S2 indicative of the strength.

In the third detection signal generation unit 21, the potential difference between the output ports E11 and E12 varies depending on the strength of the X-directional component of the second composite magnetic field MF2. The difference detector 18 outputs a signal corresponding to the potential difference between the output ports E11 and E12 as the third detection signal S3. Thus, the third detection signal generation unit 21 detects the strength of the X-directional component of the second composite magnetic field MF2 and generates the third detection signal S3 indicative of the strength.

In the fourth detection signal generation unit 22, the potential difference between the output ports E21 and E22 varies depending on the strength of the Y-directional component of the second composite magnetic field MF2. The difference detector 28 outputs a signal corresponding to the potential difference between the output ports E21 and E22 as the fourth detection signal S4. Thus, the fourth detection signal generation unit 22 detects the strength of the Y-directional component of the second composite magnetic field MF2 and generates the fourth detection signal S4 indicative of the strength.

In the fifth detection signal generation unit 31, the potential difference between the output ports E11 and E12 varies depending on the strength of the X-directional component of the third composite magnetic field MF3. The difference detector 18 outputs a signal corresponding to the potential difference between the output ports E11 and E12 as the fifth detection signal S5. Thus, the fifth detection signal generation unit 31 detects the strength of the X-directional component of the third composite magnetic field MF3 and generates the fifth detection signal S5 indicative of the strength.

In the sixth detection signal generation unit 32, the potential difference between the output ports E21 and E22 varies depending on the strength of the Y-directional component of the third composite magnetic field MF3. The difference detector 28 outputs a signal corresponding to the potential difference between the output ports E21 and E22 as the sixth detection signal S6. Thus, the sixth detection signal generation unit 32 detects the strength of the Y-directional component of the third composite magnetic field MF3 and generates the sixth detection signal S6 indicative of the strength.

In the seventh detection signal generation unit 41, the potential difference between the output ports E11 and E12 varies depending on the strength of the X-directional component of the fourth composite magnetic field MF4. The difference detector 18 outputs a signal corresponding to the potential difference between the output ports E11 and E12 as the seventh detection signal S7. Thus, the seventh detection signal generation unit 41 detects the strength of the X-directional component of the fourth composite magnetic field MF4 and generates the seventh detection signal S7 indicative of the strength.

In the eighth detection signal generation unit 42, the potential difference between the output ports E21 and E22 varies depending on the strength of the Y-directional component of the fourth composite magnetic field MF4. The difference detector 28 outputs a signal corresponding to the potential difference between the output ports E21 and E22 as the eighth detection signal S8. Thus, the eighth detection signal generation unit 42 detects the strength of the Y-directional component of the fourth composite magnetic field MF4 and generates the eighth detection signal S8 indicative of the strength.

In the light of the production accuracy of the MR elements and other factors, the magnetization directions of the magnetization pinned layers of the plurality of MR elements in the detection signal generation units 11, 12, 21, 22, 31, 32, 41 and 42 may be slightly different from the above-described directions.

Figure 7:
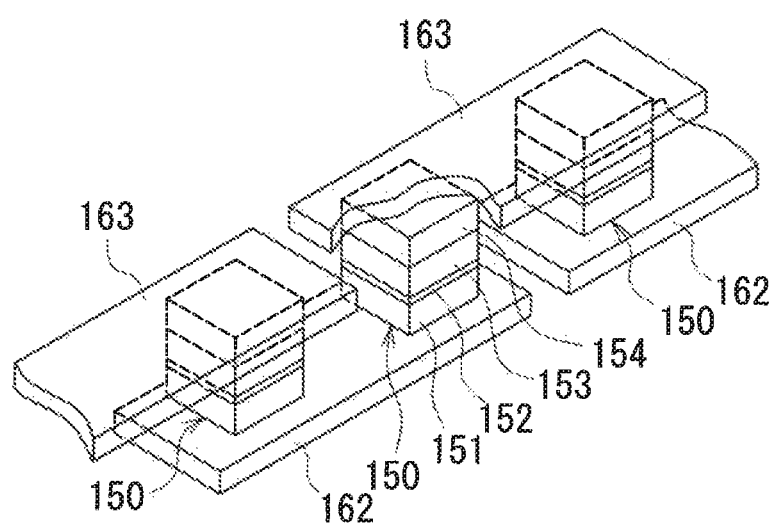
FIG. 7 is a perspective view of a portion of a magnetic detection element shown in FIG. 5 and FIG. 6.

An example of the configuration of the magnetic detection elements will now be described with reference to FIG. 7. FIG. 7 is a perspective view illustrating a portion of a magnetic detection element in the detection signal generation units 11 and 12 shown in FIG. 5 and FIG. 6. In this example, the magnetic detection element includes a plurality of lower electrodes 162, a plurality of MR elements 150 and a plurality of upper electrodes 163. The plurality of lower electrodes 162 are arranged on a substrate (not illustrated). Each of the lower electrodes 162 has a long slender shape. Every two lower electrodes 162 that are adjacent to each other in the longitudinal direction of the lower electrodes 162 have a gap therebetween. As shown in FIG. 7, MR elements 150 are provided on the top surfaces of the lower electrodes 162, near opposite ends in the longitudinal direction. Each of the MR elements 150 includes a free layer 151, a nonmagnetic layer 152, a magnetization pinned layer 153, and an antiferromagnetic layer 154 which are stacked in this order, the free layer 151 being closest to the lower electrode 162. The free layer 151 is electrically connected to the lower electrode 162. The antiferromagnetic layer 154 is formed of an antiferromagnetic material. The antiferromagnetic layer 154 is in exchange coupling with the magnetization pinned layer 153 so as to pin the magnetization direction of the magnetization pinned layer 153. The plurality of upper electrodes 163 are arranged over the plurality of MR elements 150. Each of the upper electrodes 163 has a long slender shape, and establishes electrical connection between the respective antiferromagnetic layers 154 of two adjacent MR elements 150 that are arranged on two lower electrodes 162 adjacent in the longitudinal direction of the lower electrodes 162. With such a configuration, the plurality of MR elements 150 in the magnetic detection element shown in FIG. 7 are connected in series by the plurality of lower electrodes 162 and the plurality of upper electrodes 163. It should be appreciated that the layers 151 to 154 of the MR elements 150 may be stacked in the reverse order to that shown in FIG. 7.

Now, a description will be given of a method for generating the first to the fourth composite magnetic field information. The first vector generation unit 15 of the first composite magnetic field information generation unit 10 generates the vector Y1 representing the first composite magnetic field information. The first vector generation unit 15 obtains the direction $D_1$ and the magnitude $Ma_1$ of the vector Y1 on the basis of the first and second detection signals S1 and S2 converted into digital signals by the A/D converters 13 and 14. The direction $D_1$ corresponds to information on the direction of the first composite magnetic field MF1. In the present embodiment, the direction $D_1$ is expressed using the angle $\theta_1$ (see FIG. 2) that the direction of the first composite magnetic field MF1 forms with respect to the reference direction DR. The magnitude $Ma_1$ corresponds to information on the strength of the first composite magnetic field MF1.

The second vector generation unit 25 of the second composite magnetic field information generation unit 20 generates the vector Y2 representing the second composite magnetic field information. The second vector generation unit 25 obtains the direction $D_2$ and the magnitude $Ma_2$ of the vector Y2 on the basis of the third and fourth detection signals S3 and S4 converted into digital signals by the A/D converters 23 and 24. The direction $D_2$ corresponds to information on the direction of the second composite magnetic field MF2. In the present embodiment, the direction $D_2$ is expressed using the angle $\theta_2$ (see FIG. 2) that the direction of the second composite magnetic field MF2 forms with respect to the reference direction DR. The magnitude $Ma_2$ corresponds to information on the strength of the second composite magnetic field MF2.

The third vector generation unit 35 of the third composite magnetic field information generation unit 30 generates the vector Y3 representing the third composite magnetic field information. The third vector generation unit 35 obtains the direction $D_3$ and the magnitude $Ma_3$ of the vector Y3 on the basis of the fifth and sixth detection signals S5 and S6 converted into digital signals by the A/D converters 33 and 34. The direction $D_3$ corresponds to information on the direction of the third composite magnetic field MF3. In the present embodiment, the direction $D_3$ is expressed using the angle $\theta_3$ (see FIG. 2) that the direction of the third composite magnetic field MF3 forms with respect to the reference direction DR. The magnitude $Ma_3$ corresponds to information on the strength of the third composite magnetic field MF3.

The fourth vector generation unit 45 of the fourth composite magnetic field information generation unit 40 generates the vector Y4 representing the fourth composite magnetic field information. The fourth vector generation unit 45 obtains the direction $D_4$ and the magnitude $Ma_4$ of the vector Y4 on the basis of the seventh and eighth detection signals S7 and S8 converted into digital signals by the A/D converters 43 and 44. The direction $D_4$ corresponds to information on the direction of the fourth composite magnetic field MF4. In the present embodiment, the direction $D_4$ is expressed using the angle $\theta_4$ (see FIG. 2) that the direction of the fourth composite magnetic field MF4 forms with respect to the reference direction DR. The magnitude $Ma_4$ corresponds to information on the strength of the fourth composite magnetic field MF4.

A method of generating the vectors Y1 to Y4 will now be described specifically. The first vector generation unit 15 calculates the arctangent of the ratio of the second detection signal S2 to the first detection signal S1 to obtain the direction $D_1$ of the vector Y1, i.e., the angle $\theta_1$. To be more specific, the first vector generation unit 15 obtains the angle $\theta_1$ from the following Eq. (1). In Eq. (1), "a tan" represents arctangent.

$$\theta_1 = a\ \tan(S2/S1) \qquad (1)$$

For $\theta_1$ within the range of 0° to less than 360°, Eq. (1) yields two solutions that are 180° different in value. Which of the two solutions for $\theta_1$ in Eq. (1) is the true value of $\theta_1$ can be determined from the combination of positive and negative signs of S1 and S2. The first vector generation unit 15 obtains $\theta_1$ within the range of 0° to less than 360° from Eq. (1) and on the basis of the foregoing determination on the combination of positive and negative signs of S1 and S2.

Further, the first vector generation unit 15 calculates the sum $S1^2 + S2^2$ of the square of the first detection signal S1 and the square of the second detection signal S2 to obtain the magnitude $Ma_1$ of the vector Y1. As described previously, the first detection signal S1 is indicative of the strength of the X-directional component of the first composite magnetic field MF1, and the second detection signal S2 is indicative of the strength of the Y-directional component of the first composite magnetic field MF1. Thus, $S1^2 + S2^2$ is a parameter having a correspondence with the strength of the first composite magnetic field MF1.

The second vector generation unit 25 calculates the arctangent of the ratio of the fourth detection signal S4 to the third detection signal S3 to obtain the direction $D_2$ of the vector Y2, i.e., the angle $\theta_2$. To be more specific, as in the case of the angle $\theta_1$, the second vector generation unit 25 obtains the angle $\theta_2$ within the range of 0° to less than 360° from the following Eq. (2).

$$\theta_2 = a\ \tan(S4/S3) \qquad (2)$$

Further, the second vector generation unit 25 calculates the sum $S3^2 + S4^2$ of the square of the third detection signal S3 and the square of the fourth detection signal S4 to obtain the magnitude $Ma_2$ of the vector Y2. As described previously, the third detection signal S3 is indicative of the strength of the X-directional component of the second composite magnetic field MF2, and the fourth detection signal S4 is indicative of the strength of the Y-directional component of the second composite magnetic field MF2. Thus, $S3^2 + S4^2$ is a parameter having a correspondence with the strength of the second composite magnetic field MF2.

The third vector generation unit 35 calculates the arctangent of the ratio of the sixth detection signal S6 to the fifth detection signal S5 to obtain the direction $D_3$ of the vector Y3, i.e., the angle $\theta_3$. To be more specific, as in the case of the angle $\theta_1$, the third vector generation unit 35 obtains the angle $\theta_3$ within the range of 0° to less than 360° from the following Eq. (3).

$$\theta_3 = a\ \tan(S6/S5) \qquad (3)$$

Further, the third vector generation unit 35 calculates the sum $S5^2 + S6^2$ of the square of the fifth detection signal S5 and the square of the sixth detection signal S6 to obtain the magnitude $Ma_3$ of the vector Y3. As described previously, the fifth detection signal S5 is indicative of the strength of the X-directional component of the third composite magnetic field MF3, and the sixth detection signal S6 is indicative of the strength of the Y-directional component of the third composite magnetic field MF3. Thus, $S5^2+S6^2$ is a parameter having a correspondence with the strength of the third composite magnetic field MF3.

The fourth vector generation unit 45 calculates the arctangent of the ratio of the eighth detection signal S8 to the seventh detection signal S7 to obtain the direction $D_4$ of the vector Y4, i.e., the angle $\theta_4$. To be more specific, as in the case of the angle $\theta_1$, the fourth vector generation unit 45 obtains the angle $\theta_4$ within the range of 0° to less than 360° from the following Eq. (4).

$$\theta_4 = a\tan(S8/S7) \quad (4)$$

Further, the fourth vector generation unit 45 calculates the sum $S7^2+S8^2$ of the square of the seventh detection signal S7 and the square of the eighth detection signal S8 to obtain the magnitude $Ma_4$ of the vector Y4. As described previously, the seventh detection signal S7 is indicative of the strength of the X-directional component of the fourth composite magnetic field MF4, and the eighth detection signal S8 is indicative of the strength of the Y-directional component of the fourth composite magnetic field MF4. Thus, $S7^2+S8^2$ is a parameter having a correspondence with the strength of the fourth composite magnetic field MF4.

The magnitudes $Ma_1$, $Ma_2$, $Ma_3$, and $Ma_4$ may be $S1^2+S2^2$, $S3^2+S4^2$, $S5^2+S6^2$, and $S7^2+S8^2$ themselves, respectively. Alternatively, the magnitudes $Ma_1$, $Ma_2$, $Ma_3$, and $Ma_4$ may be the strengths of the composite magnetic fields MF1, MF2, MF3, and MF4 obtained from $S1^2+S2^2$, $S3^2+S4^2$, $S5^2+S6^2$, and $S7^2+S8^2$, respectively. Otherwise, the vector generation units 15, 25, 35, and 45 may obtain the values of parameters that have correspondences with the strengths of the composite magnetic fields MF1, MF2, MF3, and MF4, other than $S1^2+S2^2$, $S3^2+S4^2$, $S5^2+S6^2$, and $S7^2+S8^2$, and determine the magnitudes $Ma_1$, $Ma_2$, $Ma_3$, and $Ma_4$ on the basis of the values of the parameters.

A description will now be given of the configuration of the angle computing unit 50 and a generation method for the detected angle value θs. First, the generation method for the detected angle value θs in the present embodiment will be conceptually described. In the present embodiment, the angle computing unit 50 generates the detected angle value θs using the method of least squares. To be more specific, the angle computing unit 50 determines a first estimated value M and a second estimated value E so as to minimize the sum of squares of differences between respective corresponding ones of the plurality of pieces of composite magnetic field information and a plurality of pieces of estimated composite magnetic field information. The first estimated value M includes direction information corresponding to the detected angle value θs, and magnitude information corresponding to the strength of the target magnetic field at a predetermined position. The second estimated value E includes direction information corresponding to the direction of the noise magnetic field Mex and magnitude information corresponding to the strength of the noise magnetic field Mex.

The plurality of pieces of estimated composite magnetic field information are estimated information of the plurality of pieces of composite magnetic field information. The plurality of pieces of estimated composite magnetic field information are generated on the basis of the first and second estimated values M and E. In the present embodiment, the plurality of pieces of estimated composite magnetic field information are modeled by the following Eq. (5).

$$z = Hx \quad (5)$$

In Eq. (5), z represents an m-dimensional column vector that contains m number of elements having correspondences with the plurality of pieces of estimated composite magnetic field information generated on the basis of the first and second estimated values M and E to be obtained. Note that m is an integer representing the number of the plurality of pieces of estimated composite magnetic field information, and is equal to the number of the plurality of pieces of composite magnetic field information. In Eq. (5), H is a matrix with m rows and two columns defined according to the patterns of the target magnetic field and the noise magnetic field Mex at the plurality of detection positions. In Eq. (5), x is a two-dimensional column vector containing the first estimated value M and the second estimated value E as its elements.

In the present embodiment, the first and second estimated values M and E are determined by determining the column vector x. Here, let y represent an m-dimensional column vector containing m number of elements having correspondences with the plurality of pieces of composite magnetic field information. The column vector x is determined so as to minimize the sum of squares of differences between respective corresponding ones of the m number of elements of the column vector y and the m number of elements of the column vector z. In the concrete, this is accomplished by defining a least squares cost function F for determining the column vector x, and obtaining the column vector x that minimizes the value of the function F. The function F is defined by the following Eq. (6).

$$\begin{aligned} F &= \|y-z\|^2 \\ &= \|y-Hx\|^2 \\ &= (y-Hx)^T(y-Hx) \\ &= y^T y - x^T H^T y - y^T Hx + x^T H^T Hx \end{aligned} \quad (6)$$

Partial differentiation of Eq. (6) with respect to x yields the following Eq. (7).

$$\partial F/\partial x = 2(-H^T y + H^T Hx) \quad (7)$$

When x minimizes the value of the function F, $\partial F/\partial x = 0$ is satisfied. Thus, x that minimizes the value of the function F is expressed by the following Eq. (8).

$$x = (H^T H)^{-1} H^T y \quad (8)$$

In the present embodiment, the angle computing unit 50 determines the detected angle value θs on the basis of the first estimated value M, which is one of the two elements of the column vector x calculated from Eq. (8).

As described above, the column vector y contains a plurality of elements having correspondences with the plurality of pieces of composite magnetic field information, and the column vector z contains a plurality of elements having correspondences with the plurality of pieces of estimated composite magnetic field information. The above-described method of determining the column vector x using Eqs. (6) to (8) can thus be said to be the method of determining the first and second estimated values M and E so as to minimize the sum of squares of differences between respective corresponding ones of the plurality of pieces of composite magnetic field information and the plurality of pieces of estimated composite magnetic field information.

Figure 4:
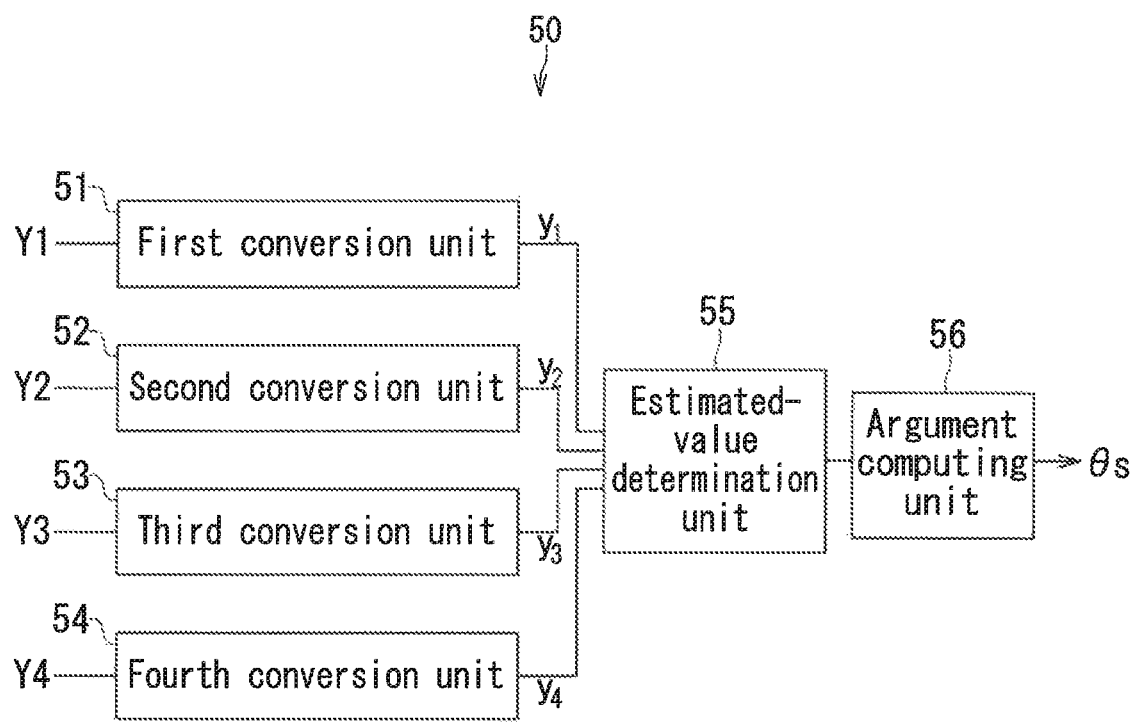
FIG. 4 is a functional block diagram illustrating an example configuration of an angle computing unit of the first embodiment of the invention.

Reference is now made to FIG. 4 to specifically describe the configuration of the angle computing unit 50 and the generation method for the detected angle value θs. In the present embodiment, the angle computing unit 50 performs operations using complex numbers, for example. FIG. 4 is a block diagram illustrating an example configuration of the angle computing unit 50. In this example, the angle computing unit 50 includes a first conversion unit 51, a second conversion unit 52, a third conversion unit 53, a fourth conversion unit 54, an estimated-value determination unit 55, and an argument computing unit 56.

The first conversion unit 51 converts the vector Y1 representing the first composite magnetic field information into a complex number $y_1$. The real part $Re_1$ and the imaginary part $Im_3$ of the complex number $y_1$ are expressed by the following Eqs. (9A) and (9B), respectively.

$$Re_1 = A_1 \cdot \cos \theta_1 \quad (9A)$$

$$Im_1 = A_1 \cdot \sin \theta_1 \quad (9B)$$

The second conversion unit 52 converts the vector Y2 representing the second composite magnetic field information into a complex number $y_2$. The real part $Re_2$ and the imaginary part $Im_2$ of the complex number $y_2$ are expressed by the following Eqs. (10A) and (10B), respectively.

$$Re_2 = A_2 \cdot \cos \theta_2 \quad (10A)$$

$$Im_2 = A_2 \cdot \sin \theta_2 \quad (10B)$$

The third conversion unit 53 converts the vector Y3 representing the third composite magnetic field information into a complex number $y_3$. The real part $Re_3$ and the imaginary part $Im_3$ of the complex number $y_3$ are expressed by the following Eqs. (11A) and (11B), respectively.

$$Re_3 = A_3 \cdot \cos \theta_3 \quad (11A)$$

$$Im_3 = A_3 \cdot \sin \theta_3 \quad (11B)$$

The fourth conversion unit 54 converts the vector Y4 representing the fourth composite magnetic field information into a complex number $y_4$. The real part $Re_4$ and the imaginary part $Im_4$ of the complex number $y_4$ are expressed by the following Eqs. (12A) and (12B), respectively.

$$Re_4 = A_4 \cdot \cos \theta_4 \quad (12A)$$

$$Im_4 = A_4 \cdot \sin \theta_4 \quad (12B)$$

The estimated-value determination unit 55 determines the first and second estimated values M and E using the complex numbers $y_1$ to $y_4$ having correspondences with the vectors Y1 to Y4, respectively. Here, let $z_1$, $z_2$, $z_3$, and $z_4$ represent first, second, third, and fourth estimated composite magnetic field information which are estimated information of the first, second, third, and fourth composite magnetic field information, respectively. In the present embodiment, the first to fourth estimated composite magnetic field information $z_1$ to $z_4$ are modeled by the following Eq. (13).

$$\begin{bmatrix} z_1 \\ z_2 \\ z_3 \\ z_4 \end{bmatrix} = \begin{bmatrix} \frac{1}{(r_1)^3} & 1 \\ \frac{1}{(r_2)^3} & 1 \\ \frac{1}{(r_3)^3} & 1 \\ \frac{1}{(r_4)^3} & 1 \end{bmatrix} \begin{bmatrix} M \\ E \end{bmatrix} \quad (13)$$

The four-dimensional column vector on the left side of Eq. (13) corresponds to z of Eq. (5).

The matrix with four rows and two columns on the right side of Eq. (13) corresponds to H of Eq. (5). This matrix is hereinafter represented by $H_c$. The four elements of the first column of the matrix $H_c$ are defined according to the patterns of the target magnetic field at the first to fourth detection positions P1 to P4, in other words, the patterns of the first to fourth partial magnetic fields MFa to MFd. In the present embodiment, the four elements of the first column of the matrix $H_c$ are defined on the assumption that the first to fourth partial magnetic fields MFa to MFd are in the same direction, and the strength of the target magnetic field decreases in inverse proportion to the third power of the distance between the magnetic field generation unit 5 and the detection position. More specifically, as represented by Eq. (13), the four elements of the first column of the matrix $H_c$ are defined using $r_1$, $r_2$, $r_3$, and $r_4$. Each of $r_1$, $r_2$, $r_3$ and $r_4$ is the ratio of the distance between the magnetic field generation unit 5 and the detection position P1, P2, P3 or P4 to the distance between the magnetic field generation unit 5 and the foregoing predetermined position.

The four elements of the second column of the matrix H are defined according to the patterns of the noise magnetic field Mex at the first to fourth detection positions P1 to P4. In the present embodiment, the four elements of the second column of the matrix $H_c$ are defined on the assumption that the noise magnetic field Mex is in the same direction and has the same strength at the first to fourth detection positions P1 to P4. More specifically, as represented by Eq. (13), all of the four elements of the second column of the matrix $H_c$ are set at 1.

The two-dimensional column vector on the right side of Eq. (13) corresponds to x of Eq. (5). This column vector is hereinafter represented by $x_c$. The column vector $x_c$ contains the first estimated value M and the second estimated value E as its elements. In the present embodiment, both of the first and second estimated values M and E are complex numbers. The argument of the first estimated value M represents direction information corresponding to the detected angle value θs. The absolute value of the first estimated value M represents magnitude information corresponding to the strength of the target magnetic field at the predetermined position. In the present embodiment, the predetermined position is the reference position. The argument of the second estimated value E represents direction information corresponding to the direction of the noise magnetic field Mex. The absolute value of the second estimated value E represents magnitude information corresponding to the strength of the noise magnetic field Mex.

The estimated-value determination unit 55 determines the column vector $x_c$ on the basis of Eq. (8). Here, let $y_c$ represent a four-dimensional column vector containing the complex numbers $y_1$ to $y_4$ as its elements. The column vector $y_c$ is expressed by the following Eq. (14).

$$y_c^T = [y_1, y_2, y_3, y_4] \quad (14)$$

The estimated-value determination unit 55 calculates $x_c$ by replacing H, x, and y in Eq. (8) with $H_c$, $x_c$, and $y_c$, respectively. The first and second estimated values M and E are thereby determined.

The argument computing unit 56 determines the detected angle value θs on the basis of the first estimated value M determined by the estimated-value determination unit 55. In the present embodiment, the argument of the first estimated value M is used as the detected angle value θs. The argument computing unit 56 thus obtains the argument of the first estimated value M to calculate the detected angle value θs. To be more specific, the argument computing unit 56 calculates θs from the following Eq. (15) using, for example, the real part $Re_M$ and the imaginary part $Im_M$ of the first estimated value M.

$$\theta s = a\tan(Im_M/Re_M) \quad (15)$$

For θs within the range of 0° to less than 360°, Eq. (15) yields two solutions that are 180° different in value. Which of the two solutions for θs in Eq. (15) is the true value of θs can be determined from the combination of positive and negative signs of $Re_M$ and $Im_M$. The argument computing unit 56 obtains θs within the range of 0° to less than 360° from Eq. (15) and on the basis of the foregoing determination on the combination of positive and negative signs of $Re_M$ and $Im_M$.

In the present embodiment, the detected angle value θs is generated using the method of least squares on the basis of the first to fourth composite magnetic field information generated by the first to fourth composite magnetic field information generation units 10, 20, 30, and 40. The first to fourth detection positions P1 to P4 are different from each other. This causes the noise magnetic field Mex to have different relative effects on the first to fourth composite magnetic field information. This may result in differences dependent on the noise magnetic field Mex between the first to fourth composite magnetic field information. In the present embodiment, in particular, the relative effect of the noise magnetic field Mex increases with increasing distance between the magnetic field generation unit 5 and the detection position.

By using the above-described characteristic, it is possible to estimate an ideal target magnetic field (hereinafter referred to as ideal field) at a predetermined position and the noise magnetic field Mex. The ideal field is such a virtual magnetic field that the angle formed by the direction of the ideal field with respect to the reference direction DR corresponds to a true angle to be detected by the angle sensor 1. In the present embodiment, the angle formed by the direction of the ideal field with respect to the reference direction DR is equal to the rotating field angle θM.

In the present embodiment, the first estimated value M determined by the estimated-value determination unit 55 corresponds to an estimated ideal field, and the second estimated value E determined by the estimated-value determination unit 55 corresponds to an estimated noise magnetic field Mex. In the present embodiment, the detected angle value θs is determined on the basis of the first estimated value M. The present embodiment thus enables estimating the detected angle value θs with the effect of the noise magnetic field Mex eliminated. In other words, the present embodiment enables reducing an angle error caused by the noise magnetic field Mex.

To determine the detected angle value θs in the above-described manner, it is required to satisfy the condition that the first to fourth positions P1 to P4 are different from each other, however, this condition introduces no substantial limitations with respect to the structure or installation of the angle sensor 1 or the angle sensor system 100. The aforementioned condition can easily be satisfied by, for example, making the first to fourth detection positions P1 to P4 be located at different distances from the magnetic field generation unit 5 as in the present embodiment.

For the foregoing reasons, the present embodiment enables reduction of the angular error caused by the noise magnetic field Mex, without introducing any substantial limitations with respect to the structure or installation of the angle sensor 1 or the angle sensor system 100.

The effects of the present embodiment will now be described with reference to simulation results. The simulation obtained the respective angular errors of the angles $\theta_1$ to $\theta_4$ and the detected angle value θs that were generated in the presence of a noise magnetic field Mex having a constant direction and strength. The simulation used a reference angle θr, which corresponds to a true angle to be detected, to obtain the angular errors. To be more specific, the difference between the angle $\theta_1$ and the reference angle θr was assumed to be the angular error of the angle $\theta_1$, the difference between the angle $\theta_2$ and the reference angle θr was assumed to be the angular error of the angle $\theta_2$, the difference between the angle $\theta_3$ and the reference angle θr was assumed to be the angular error of the angle $\theta_3$, the difference between the angle $\theta_4$ and the reference angle θr was assumed to be the angular error of the angle $\theta_4$, and the difference between the detected angle value θs and the reference angle θr was assumed to be the angular error of the detected angle value θs. Further, in the simulation, an error generated by a random number was superimposed on each of the values of the angles $\theta_1$ to $\theta_4$. This error is assumed to be a normal error generated in the angle sensor 1. The normal error includes an error owing to the nonlinearity of the first, second, third or fourth composite magnetic field information generation unit 10, 20, 30 or 40 and an error owing to white noise. An angular error caused by the normal error is sufficiently smaller than an angular error caused by the noise magnetic field Mex.

Figure 8:
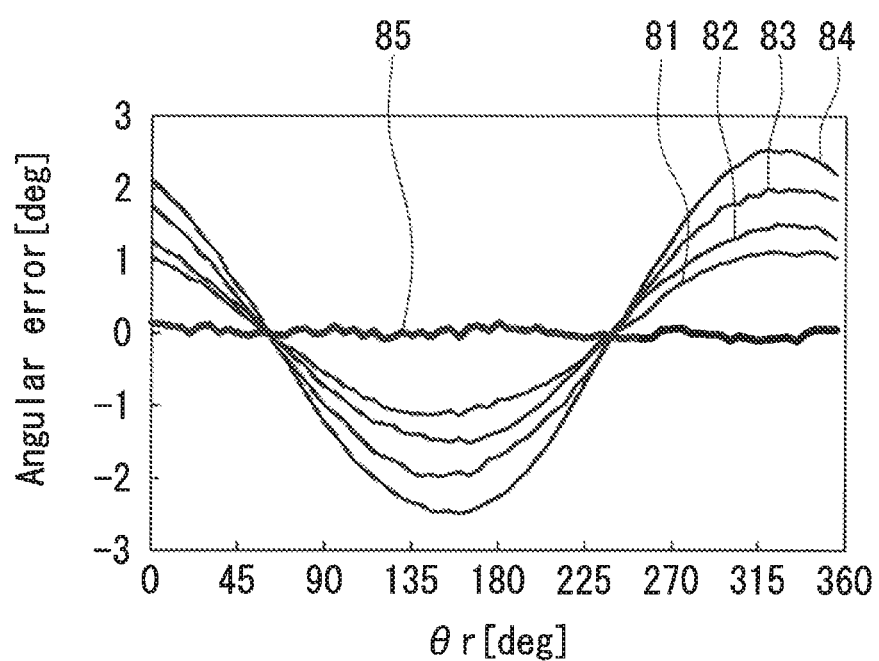
FIG. 8 is a waveform diagram illustrating an example of waveforms of angular errors of the first embodiment of the invention.

FIG. 8 is a waveform diagram illustrating an example of angular errors obtained by the simulation. In FIG. 8 the horizontal axis represents the reference angle θr, and the vertical axis represents angular error. The reference numeral 81 represents the angular error of the angle $\theta_1$, the reference numeral 82 represents the angular error of the angle $\theta_2$, the reference numeral 83 represents the angular error of the angle θ3, the reference numeral 84 represents the angular error of the angle $\theta_4$, and the reference numeral 85 represents the angular error of the detected angle value θs. As shown in FIG. 8, the angular error of the detected angle value θs is extremely smaller than the angular error of each of the angles $\theta_1$ to $\theta_4$. The angular errors of the angles $\theta_1$ to $\theta_4$ are mainly attributable to the noise magnetic field Mex. On the other hand, the angular error of the detected angle value θs is mainly attributable to the normal error. Thus, the present embodiment enables reduction of angular errors caused by the noise magnetic field Mex.

As shown in FIG. 8, the angular errors of the angles $\theta_1$ to $\theta_4$ are different in amplitude from each other. This is due to the differences between the relative effects of the noise magnetic field Mex on the first to the forth composite magnetic field information. In the present embodiment, the first to fourth detection positions P1, P2, P3 and P4 are arranged in this order in the direction away from the magnetic field generation unit 5. Accordingly, the strengths of the first to fourth partial magnetic fields MFa, MFb, MFc and MFd decrease in this order. As a result, the amplitudes of the angular errors of the angles $\theta_1$, $\theta_2$, $\theta_3$ and $\theta_4$ increase in this order.

Second Embodiment

Figure 9:
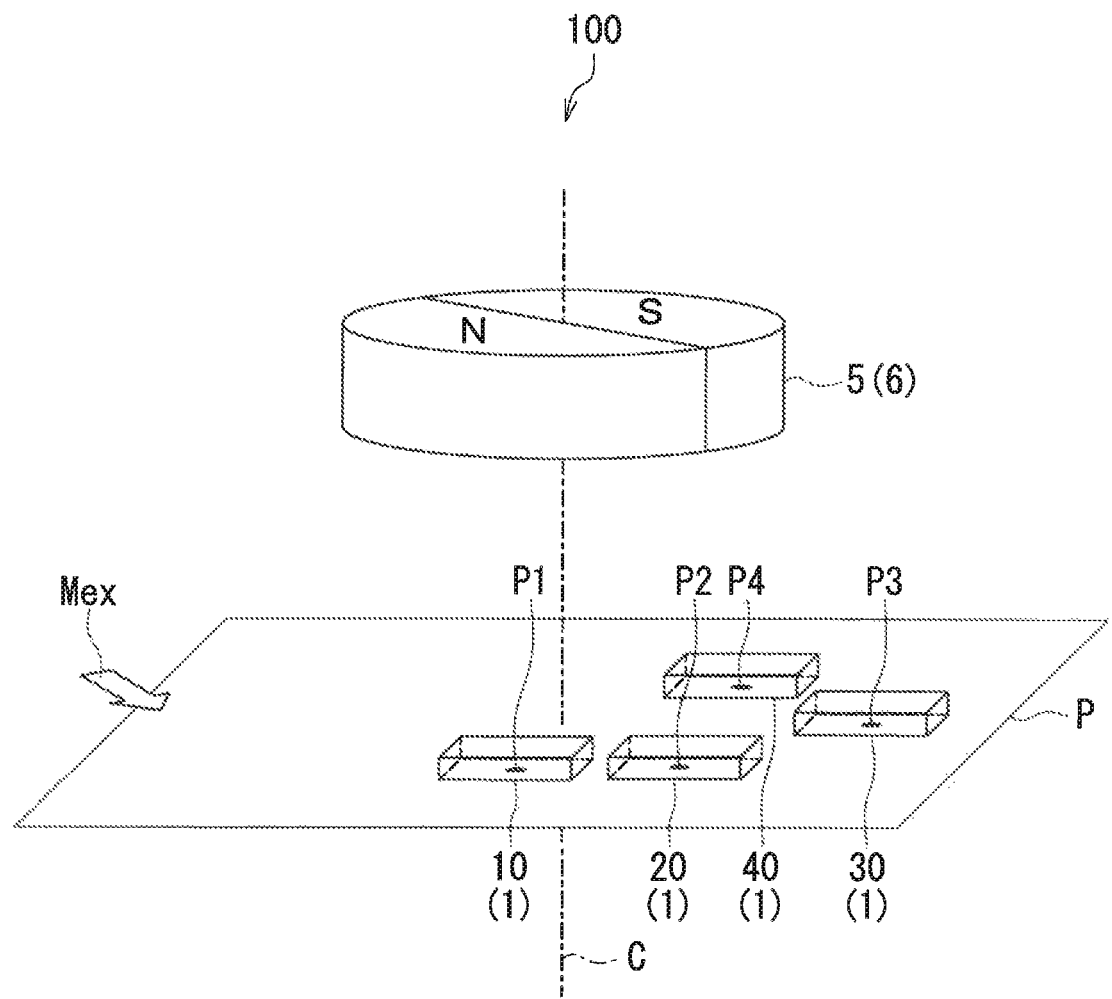
FIG. 9 is a perspective view illustrating the general configuration of an angle sensor system according to a second embodiment of the invention.

A second embodiment of the present invention will now be described. First, reference is made to FIG. 9 to describe the configuration of the angle sensor system 100 according to the second embodiment. The angle sensor system 100 according to the second embodiment is different from the angle sensor system 100 according to the first embodiment in the following ways. In the present embodiment, as shown in FIG. 9, the first to fourth detection positions P1 to P4 are located in one plane parallel to an end face of the magnet 6. An imaginary plane including the first to fourth detection positions P1 to P4 will hereinafter be referred to as the reference plane P. In the present embodiment, the first to fourth detection positions P1 to P4 are defined such that they are at equal distances from the magnetic field generation unit 5. The first to fourth detection positions P1 to P4 may lie on the circumference of one circle centered at the center of rotation C located in the reference plane P, as shown in FIG. 9. In the example shown in FIG. 9, the first to fourth detection positions P1 to P4 lie on the aforementioned circumference and are arranged in this order in a counter-clockwise direction. Note that it is not necessarily required that all of the first to fourth detection positions P1 to P4 should lie on the aforementioned circumference.

As with the first embodiment, the target magnetic field at the first detection position P1 will be referred to as the first partial magnetic field MFa, the target magnetic field at the second detection position P2 will be referred to as the second partial magnetic field MFb, the target magnetic field at the third detection position P3 will be referred to as the third partial magnetic field MFc, and the target magnetic field at the fourth detection position P4 will be referred to as the fourth partial magnetic field MFd.

Ideally, the first to fourth partial magnetic fields MFa to MFd should be in the same direction as the direction of the ideal field described in relation to the first embodiment. However, when the first to fourth positions P1 to P4 are located away from the center of rotation C as in the present embodiment, the first to fourth partial magnetic fields MFa to MFd are not always in the same direction as the direction of the ideal field.

The angles that the directions of the first to fourth partial magnetic fields MFa to MFd form with respect to the direction of the ideal field will be referred to as direction errors of the first to fourth partial magnetic fields MFa to MFd. The direction errors of the first to fourth partial magnetic fields MFa to MFd cause the angular errors of the angles $\theta_1$ to $\theta_4$ described in relation to the first embodiment. When the angle to be detected varies with a predetermined period, the direction errors of the first to fourth partial magnetic fields MFa to MFd vary with a period of ½ the predetermined period, and their variations have different phases from each other. Thus, the variations in direction of the first to fourth partial magnetic fields MFa to MFd according to the angle to be detected exhibit different patterns from each other.

A generation method for the detected angle value $\theta$s in the present embodiment will now be described. The generation method for the detected angle value $\theta$s is basically the same as that in the first embodiment. In the present embodiment, however, the first to fourth estimated composite magnetic field information $z_1$ to $z_4$ are modeled by the following Eq. (16).

$$\begin{bmatrix} z_1 \\ z_2 \\ z_3 \\ z_4 \end{bmatrix} = \begin{bmatrix} \cos\{A_1\sin(2\theta+\alpha_1)\} + i\sin\{A_1\sin(2\theta+\alpha_1)\} & 1 \\ \cos\{A_2\sin(2\theta+\alpha_2)\} + i\sin\{A_2\sin(2\theta+\alpha_2)\} & 1 \\ \cos\{A_3\sin(2\theta+\alpha_3)\} + i\sin\{A_3\sin(2\theta+\alpha_3)\} & 1 \\ \cos\{A_4\sin(2\theta+\alpha_4)\} + i\sin\{A_4\sin(2\theta+\alpha_4)\} & 1 \end{bmatrix} \begin{bmatrix} M \\ E \end{bmatrix} \quad (16)$$

The matrix with four rows and two columns on the right side of Eq. (16) corresponds to H of Eq. (5) described in relation to the first embodiment. This matrix is hereinafter represented by $H_d$. The four elements of the first column of the matrix $H_d$ are defined according to the patterns of the first to fourth partial magnetic fields MFa to MFd. In the present embodiment, as shown in Eq. (16), the four elements of the first column of the matrix $H_d$ are defined using "$A_n \sin(2\theta+\alpha_n)$", where n is an integer between 1 and 4 inclusive. $A_n$ represents the amplitudes of periodic variations of the direction errors of the first to fourth partial magnetic fields MFa to MFd, and $\alpha_n$ represents the values of the differences between the phases of the periodic variations of the direction errors of the first to fourth partial magnetic fields MFa to MFd. As described above, the direction errors of the first to fourth partial magnetic fields MFa to MFd cause the angular errors of the angles $\theta_1$ to $\theta_4$. Thus, $A_1$ to $A_4$ and $\alpha_1$ to $\alpha_4$ are obtainable from the waveforms of the angular errors of the angles $\theta_1$ to $\theta_4$.

$\theta$ represents a true angle to be detected by the angle sensor 1. To generate the detected angle value $\theta$s in the present embodiment, a value $\theta$p, which corresponds to a temporarily calculated detected angle value $\theta$s, is substituted into $\theta$ of Eq. (16). To be more specific, for example, $\theta$p is the average of the angles $\theta_1$ to $\theta_4$.

The four elements of the second column of the matrix $H_d$ are defined according to the patterns of the noise magnetic field Mex at the first to fourth detection positions P1 to P4. In the present embodiment, all of the four elements of the second column of the matrix $H_d$ are set at 1, as in the first embodiment.

In the present embodiment, the estimated-value determination unit 55 (see FIG. 4) determines the first and second estimated values M and E using the matrix $H_d$ instead of the matrix $H_c$ of the first embodiment.

As has been described in relation to the first embodiment, since the first to fourth detection positions P1 to P4 are different from each other, differences occur in the relative effects of the noise magnetic field Mex on the first to fourth composite magnetic field information. In the present embodiment, in particular, the first to fourth detection positions P1 to P4 are defined such that the variations in direction of the first to fourth partial magnetic fields MFa to MFd according to the angle to be detected exhibit different patterns from each other. This causes the noise magnetic field Mex to have different relative effects on the first to fourth composite magnetic field information. This may result in differences dependent on the noise magnetic field Mex between the first to fourth composite magnetic field information. It is possible to estimate the ideal field and the noise magnetic field Mex by using this characteristic, as has been described in relation to the first embodiment.

The effects of the present embodiment will now be described with reference to simulation results. The details of the simulation are the same as those of the simulation of the first embodiment.

Figure 10:
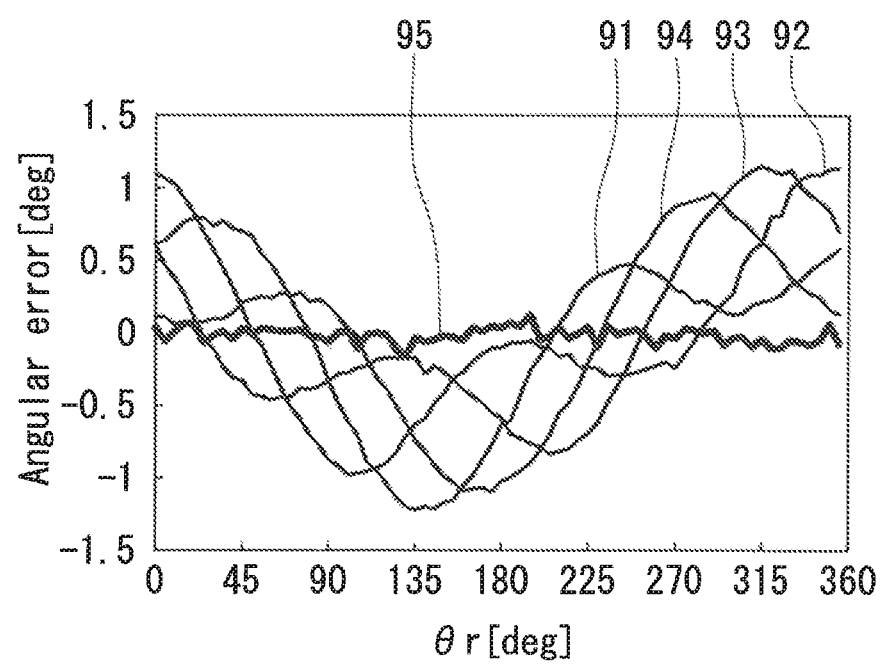
FIG. 10 is a waveform diagram illustrating an example of waveforms of angular errors of the second embodiment of the invention.

FIG. 10 is a waveform diagram illustrating an example of angular errors obtained by the simulation. In FIG. 10 the horizontal axis represents the reference angle $\theta$r, and the vertical axis represents angular error. The reference numeral 91 represents the angular error of the angle $\theta_1$, the reference numeral 92 represents the angular error of the angle $\theta_2$, the reference numeral 93 represents the angular error of the angle $\theta_3$, the reference numeral 94 represents the angular error of the angle $\theta_4$, and the reference numeral 95 represents the angular error of the detected angle value $\theta$s. As shown in FIG. 10, the angular error of the detected angle value $\theta$s is extremely smaller than the angular error of each of the angles $\theta_1$ to $\theta_4$. The angular errors of the angles $\theta_1$ to $\theta_4$ are mainly attributable to the noise magnetic field Mex and the direction errors of the first to fourth partial magnetic fields MFa to MFb. On the other hand, the angular error of the detected angle value θs is mainly attributable to the normal error. The present embodiment thus enables reducing the angular error caused by the noise magnetic field Mex and the direction errors of the first to fourth partial magnetic fields MFa to MFb. Note that, as shown in FIG. 10, variations in the angular errors of the angles $\theta_1$ to $\theta_4$ according to the reference angle θr have different phases from each other. This is due to the differences between the phases of the periodic variations of the direction errors of the first to fourth partial magnetic fields MFa to MFd according to the reference angle θr.

The other configuration, function and effects of the second embodiment are the same as those of the first embodiment.

Third Embodiment

A third embodiment of the present invention will now be described. First, reference is made to FIG. 11 to describe the configuration of the angle sensor 1 according to the third embodiment. The angle sensor 1 according to the third embodiment is different from the angle sensor 1 according to the first and second embodiments in the following ways. The first to fourth vector generation units 15, 25, 35 and 45 of the first and second embodiments are omitted from the third embodiment. The angle sensor 1 according to the third embodiment includes an angle computing unit 250 in place of the angle computing unit 50 of the first and second embodiments. The angle computing unit 250 can be implemented by an ASIC or a microcomputer, for example.

In the present embodiment, as in the first and second embodiments, the first composite magnetic field information is represented as the vector Y1, the second composite magnetic field information is represented as the vector Y2, the third composite magnetic field information is represented as the vector Y3, and the fourth composite magnetic field information is represented as the vector Y4. In the present embodiment, the first and second detection signals S1 and S2 are assumed to be two components of the vector Y1 in an orthogonal coordinate system, the third and fourth detection signals S3 and S4 are assumed to be two components of the vector Y2 in the orthogonal coordinate system, the fifth and sixth detection signals S5 and S6 are assumed to be two components of the vector Y3 in an orthogonal coordinate system, and the seventh and eighth detection signals S7 and S8 are assumed to be two components of the vector Y4 in an orthogonal coordinate system. In such a situation, it is necessary to use the first to eighth detection signal generation units 11, 12, 21, 22, 31, 32, 41 and 42 under the condition that the magnitudes of the first to eighth detection signals S1 to S8 do not become saturated within the range of the strengths of the first to fourth composite magnetic fields MF1 to MF4.

Figure 11:
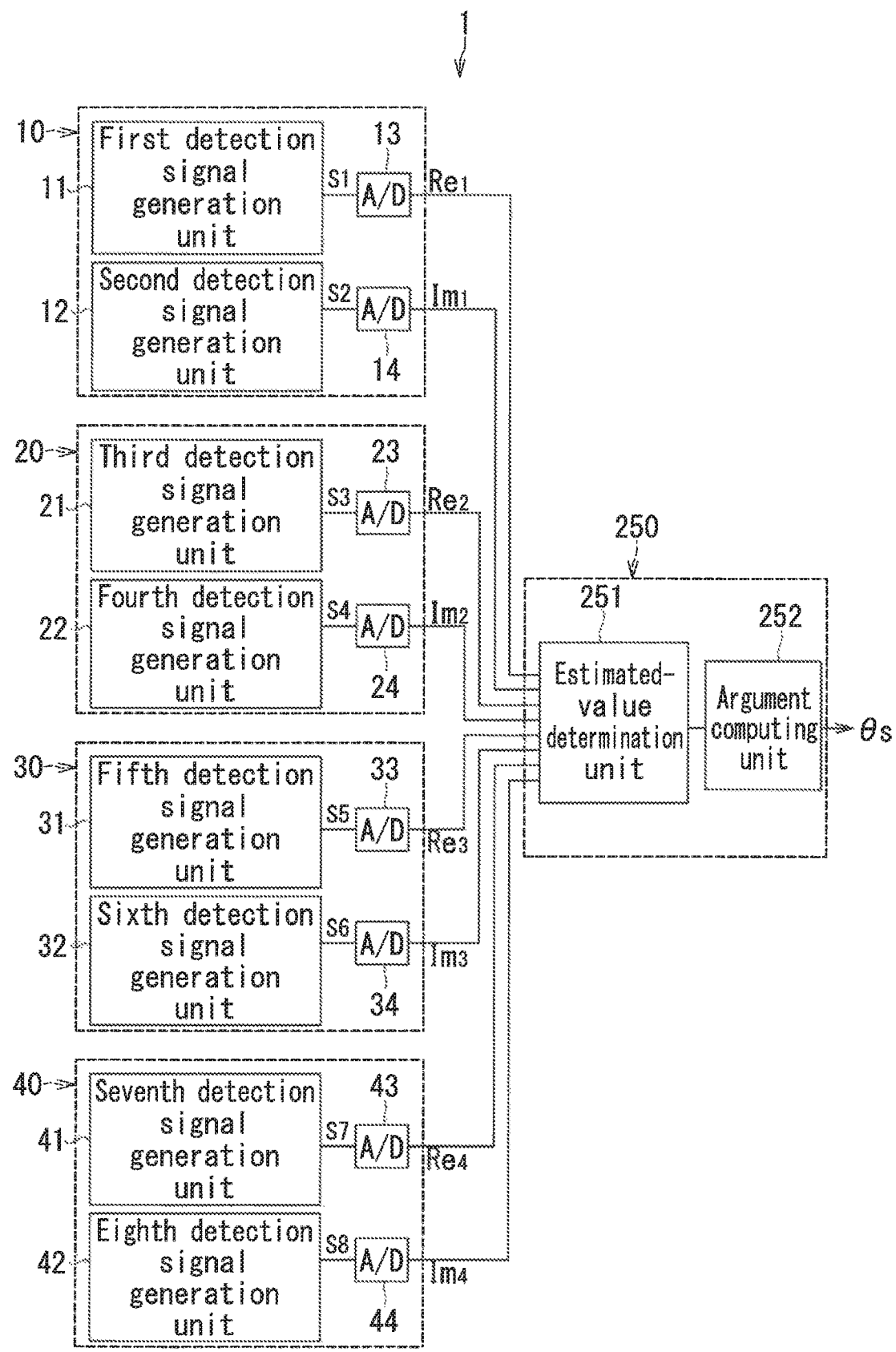
FIG. 11 is a functional block diagram illustrating the configuration of an angle sensor according to a third embodiment of the invention.

In the present embodiment, the angle computing unit 250 performs operations using complex numbers, as does the angle computing unit 50. FIG. 11 illustrates an example configuration of the angle computing unit 250. In this example, the angle computing unit 250 includes an estimated-value determination unit 251 and an argument computing unit 252. The angle computing unit 250 uses the two components of the vector Y1 in the orthogonal coordinate system as the real part $Re_1$ and the imaginary part $Im_1$ of a complex number $y_1$, uses the two components of the vector Y2 in the orthogonal coordinate system as the real part $Re_2$ and the imaginary part $Im_2$ of a complex number $y_2$, uses the two components of the vector Y3 in the orthogonal coordinate system as the real part $Re_3$ and the imaginary part $Im_3$ of a complex number $y_3$, and uses the two components of the vector Y4 in the orthogonal coordinate system as the real part $Re_4$ and the imaginary part $Im_4$ of a complex number $y_4$. To be more specific, the first and second detection signals S1 and S2 which have been converted into digital signals by the A/D converters 13 and 14 are used as the real part $Re_1$ and the imaginary part $Im_1$ of the complex number $y_1$; the third and fourth detection signals S3 and S4 which have been converted into digital signals by the A/D converters 23 and 24 are used as the real part $Re_2$ and the imaginary part $Im_2$ of the complex number $y_2$; the fifth and sixth detection signals S5 and S6 which have been converted into digital signals by the A/D converters 33 and 34 are used as the real part $Re_3$ and the imaginary part $Im_3$ of the complex number $y_3$; and the seventh and eighth detection signals S7 and S8 which have been converted into digital signals by the A/D converters 43 and 44 are used as the real part $Re_4$ and the imaginary part $Im_4$ of the complex number $y_4$.

The estimated-value determination unit 251 determines the first and second estimated values M and E using the complex numbers $y_1$ to $y_4$. The determination method for the first and second estimated values M and E is the same as that in the first or second embodiment.

The argument computing unit 252 determines the detected angle value θs on the basis of the first estimated value M. As has been described in relation to the first embodiment, the first estimated value M is a complex number. In the present embodiment, the argument of the first estimated value M is used as the detected angle value θs. The argument computing unit 252 obtains the argument of the first estimated value M to calculate the detected angle value θs. The calculation method for the detected angle value θs is the same as in the first embodiment.

According to the present embodiment, the first and second detection signals S1 and S2 are directly used as the real part $Re_1$ and the imaginary part $Im_1$ of the complex number $y_1$, the third and fourth detection signals S3 and S4 are directly used as the real part $Re_2$ and the imaginary part $Im_2$ of the complex number $y_2$, the fifth and sixth detection signals S5 and S6 are directly used as the real part $Re_3$ and the imaginary part $Im_3$ of the complex number $y_3$, and the seventh and eighth detection signals S7 and S8 are directly used as the real part $Re_4$ and the imaginary part $Im_4$ of the complex number $y_4$. The present embodiment thus eliminates the need for the operations for obtaining the directions $D_1$ to $D_4$, the magnitudes $Ma_1$ to $Ma_4$, the real parts $Re_1$ to $Re_4$, and the imaginary parts $Im_1$ to $Im_4$ described in relation to the first embodiment. This makes it easier to generate the detected angle value θs and allows the angle sensor 1 to be simpler in configuration when compared with the first and second embodiments.

The other configuration, function and effects of the third embodiment are the same as those of the first or second embodiment.

Fourth Embodiment

A fourth embodiment of the present invention will now be described. First, reference is made to FIG. 12 to describe the configuration of the angle sensor system 100 according to the fourth embodiment. The angle sensor system 100 according to the fourth embodiment is different from the angle sensor system 100 according to the second embodiment in the following ways. In the present embodiment, the number of the detection positions is represented by N, N being an integer greater than or equal to 2. All of the N number of detection positions lie in the reference plane P. The noise magnetic field Mex is in the same direction and has the same strength at the N number of detection positions.

In the present embodiment, the N number of detection positions are defined such that the target magnetic field has different strengths at least two of the N number of detection positions. In the reference plane P, the strength of the target magnetic field varies depending on the distance from the center of rotation C. Thus, at least two of the N number of detection positions are at different distances from the center of rotation C. As long as the above requirement is satisfied, there may be a plurality of detection positions at which the strengths of the target magnetic field are equal.

The angle sensor 1 according to the present embodiment includes N number of composite magnetic field information generation units in place of the first to fourth composite magnetic field generation units 10, 20, 30 and 40 of the second embodiment. For the sake of convenience, the N number of composite magnetic field information generation units will be referred to as the first to N-th composite magnetic field information generation units. An n-th composite magnetic field information generation unit will be denoted by the symbol $10I_n$, n being an integer between 1 and N inclusive.

A detection position corresponding to the composite magnetic field information generation unit $10I_n$ will be denoted by the symbol $P_n$. The composite magnetic field information generation unit $10I_n$ detects a composite magnetic field of a target magnetic field and a noise magnetic field Mex at the detection position $P_n$ to generate composite magnetic field information. In the present embodiment, each of a plurality of pieces of composite magnetic field information includes information on the direction of the composite magnetic field.

Figure 12:
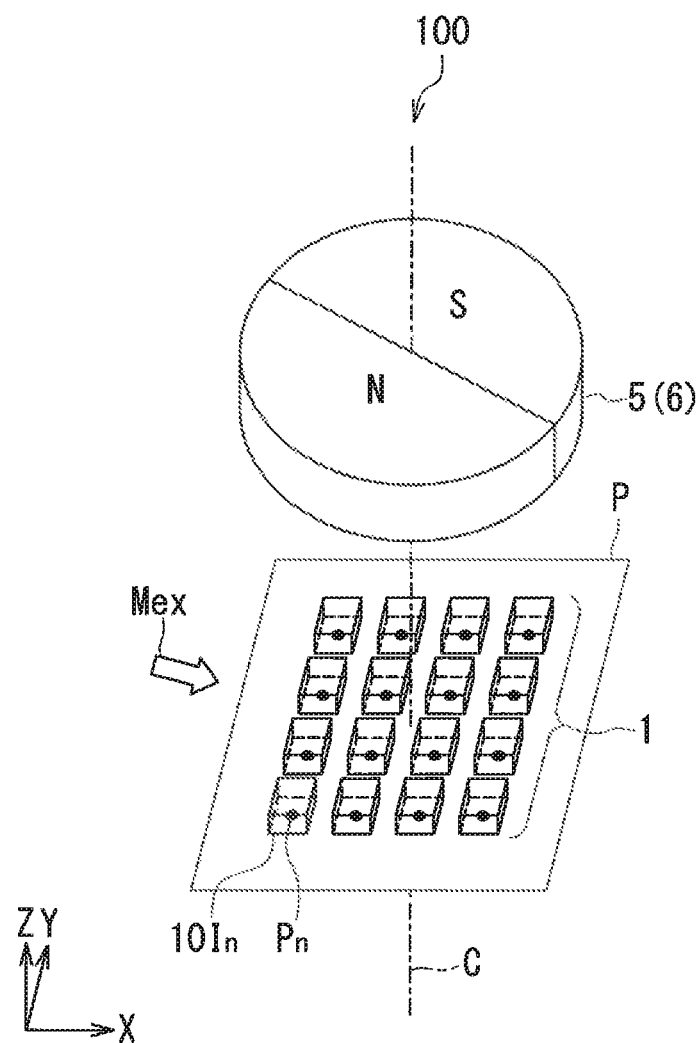
FIG. 12 is a perspective view illustrating the general configuration of an angle sensor system according to a fourth embodiment of the invention.

An angle that the composite magnetic field detected by the composite magnetic field information generation unit $10I_n$ forms with respect to the reference direction DR will be denoted by the symbol $\theta_n$. The X, Y and Z directions described in relation to the first embodiment are shown in FIG. 12. The reference direction DR is the X direction. As will be described in detail later, the composite magnetic field information generation unit $10I_n$ generates an individual angle value $\theta s_n$, which represents the angle $\theta_n$, as the composite magnetic field information. The definition of positive and negative of the angle $\theta_n$ and the individual angle value $\theta s_n$ is the same as that of the angles $\theta_1$ to $\theta_4$ in the first embodiment.

Figure 13:
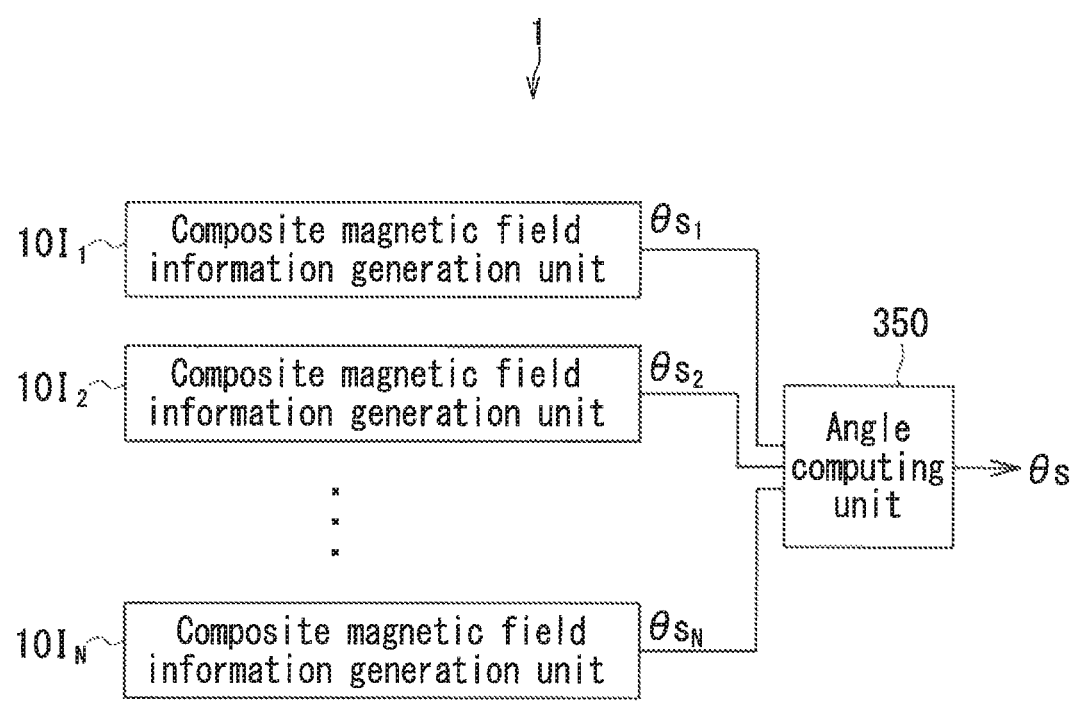
FIG. 13 is a functional block diagram illustrating the configuration of an angle sensor according to the fourth embodiment of the invention.
Figure 14:
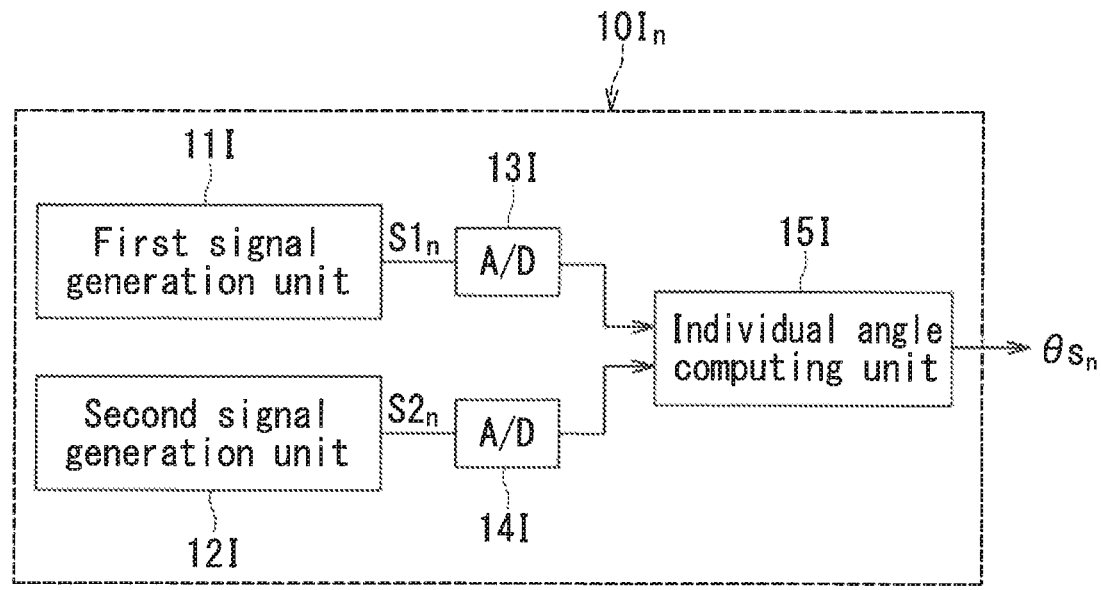
FIG. 14 is a functional block diagram illustrating an example configuration of a composite magnetic field information generation unit of the fourth embodiment of the invention.

Reference is now made to FIG. 13 and FIG. 14 to describe the configurations of the angle sensor 1 according to the present embodiment and the composite magnetic field information generation unit $10I_n$. FIG. 13 is a functional block diagram illustrating the configuration of the angle sensor 1. FIG. 14 is a functional block diagram illustrating an example configuration of the composite magnetic field information generation unit $10I_n$. As described above, the angle sensor 1 according to the present embodiment includes the N number of composite magnetic field information generation units $10I_1, 10I_2, \ldots$ and $10I_N$.

In the example shown in FIG. 14, the composite magnetic field information generation unit $10I_n$ includes a first signal generation unit 11I, a second signal generation unit 12I, A/D converters 13I and 14I, and an individual angle computing unit 15I. The first signal generation unit 11I generates a first signal $S1_n$ having a correspondence with the cosine of the angle $\theta_n$ that the direction of the composite magnetic field at the detection position $P_n$ forms with respect to the reference direction DR. The second signal generation unit 12I generates a second signal $S2_n$ having a correspondence with the sine of the angle $\theta_n$ that the direction of the composite magnetic field at the detection position $P_n$ forms with respect to the reference direction DR. The A/D converters 13I and 14I respectively convert the first and second signals $S1_n$ and $S2_n$ into digital signals. On the basis of the first and second signals $S1_n$ and $S2_n$, the individual angle computing unit 15I generates the individual angle value $\theta s_n$ representing the angle $\theta_n$, as the composite magnetic field information. The individual angle value $\theta s_n$ corresponds to information on the direction of the composite magnetic field at the detection position $P_n$. The individual angle computing unit 15I can be implemented by an ASIC, for example.

In the present embodiment, the first signal generation unit 11I has the same configuration as that of the first detection signal generation unit 11, which has been described in relation to the first embodiment with reference to FIG. 5. Thus, components of the first signal generation unit 11I are denoted by the same reference signs as those used for the components of the first detection signal generation unit 11 shown in FIG. 5. In the first signal generation unit 11I, the magnetization pinned layers of the MR elements included in the magnetic detection elements R11 and R14 are magnetized in the X direction, and the magnetization pinned layers of the MR elements included in the magnetic detection elements R12 and R13 are magnetized in the −X direction. In this case, the potential difference between the output ports E11 and E12 varies depending on the cosine of the angle $\theta_n$. The difference detector 18 outputs a signal corresponding to the potential difference between the output ports E11 and E12 as the first signal $S1_n$. The first signal generation unit 11I thus generates the first signal $S1_n$ having a correspondence with the cosine of the angle $\theta_n$.

In the present embodiment, the second signal generation unit 12I has the same configuration as that of the second detection signal generation unit 12, which has been described in relation to the first embodiment with reference to FIG. 6. Thus, components of the second signal generation unit 12I are denoted by the same reference signs as those used for the components of the second detection signal generation unit 12 shown in FIG. 6. In the second signal generation unit 12I, the magnetization pinned layers of the MR elements included in the magnetic detection elements R21 and R24 are magnetized in the Y direction, and the magnetization pinned layers of the MR elements included in the magnetic detection elements R22 and R23 are magnetized in the −Y direction. In this case, the potential difference between the output ports E21 and E22 varies depending on the sine of the angle $\theta_n$. The difference detector 28 outputs a signal corresponding to the potential difference between the output ports E21 and E22 as the second signal $S2_n$. The second signal generation unit 12I thus generates the second signal $S2_n$ having a correspondence with the sine of the angle $\theta_n$.

A generation method for the individual angle value $\theta s_n$ will now be described specifically. The individual angle computing unit 15I obtains the individual angle value $\theta s_n$ from the following Eq. (17)

$$\theta s_n = a\tan(S2_n/S1_n) \tag{17}$$

For $\theta s_n$ within the range of 0° to less than 360°, Eq. (17) yields two solutions that are 180° different in value. Which of the two solutions for $\theta s_n$ in Eq. (17) is the true value of $\theta s_n$ can be determined from the combination of positive and negative signs of $S1_n$ and $S2_n$. The individual angle computing unit 15I obtains $\theta s_n$ within the range of 0° to less than 360° from Eq. (17) and on the basis of the foregoing determination on the combination of positive and negative signs of $S1_n$ and $S2_n$.

As shown in FIG. 13, the angle sensor 1 according to the present embodiment includes an angle computing unit 350 in place of the angle computing unit 50 of the second embodiment. The angle computing unit 350 generates the detected angle value θs using the method of least squares on the basis of the plurality of pieces of composite magnetic field information, that is, the N number of individual angle values $\theta s_1$, $\theta s_2$, . . . and $\theta s_N$. The angle computing unit 350 can be implemented by an ASIC or a microcomputer, for example.

Figure 15:
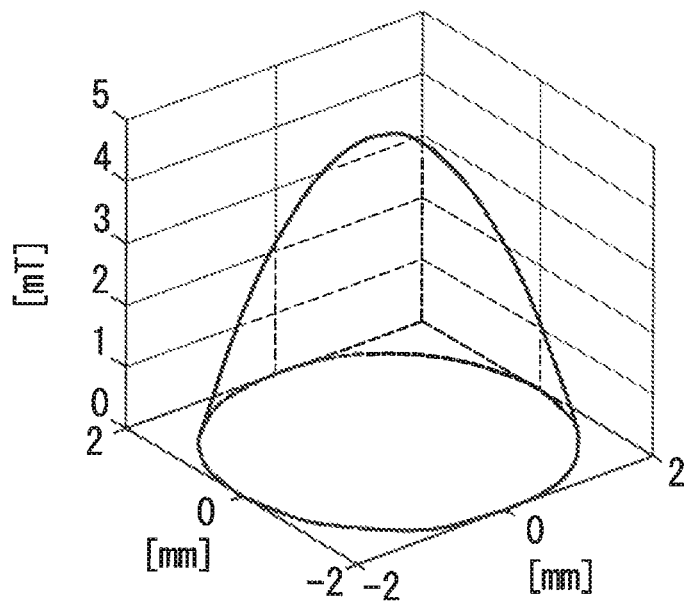
FIG. 15 is an explanatory diagram schematically illustrating the distribution of the strength of a magnetic field to be detected generated by a magnetic field generation unit of the fourth embodiment of the invention.

Now, an example of the target magnetic field and an example of the composite magnetic field in the present embodiment will be described. The present embodiment assumes a magnetic field whose strength decreases with increasing distance from the center of rotation C (see FIG. 12) in the reference plane P, as the target magnetic field generated by the magnetic field generation unit 5. FIG. 15 is an explanatory diagram schematically illustrating the distribution of the strength of the target magnetic field. In FIG. 15, the vertical axis represents the strength of the target magnetic field (in units of mT). In FIG. 15, two axes orthogonal to the vertical axis represent positions (in units of mm) in two orthogonal directions in the reference plane P. In FIG. 15, an intersection point of the reference plane P and the center of rotation C (see FIG. 12) is set at an origin point of the two axes orthogonal to the vertical axis.

Figure 16:
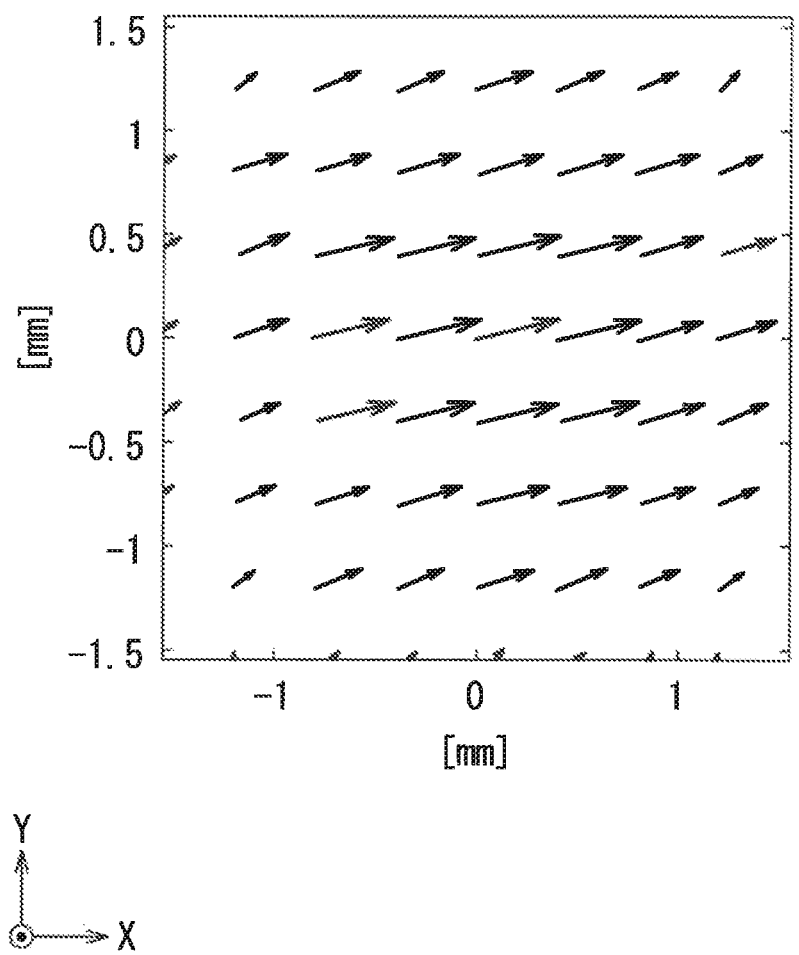
FIG. 16 is an explanatory diagram schematically illustrating the distribution of the strength and direction of a composite magnetic field in the fourth embodiment of the invention.

FIG. 16 is an explanatory diagram schematically illustrating the distribution of the strength and direction of the composite magnetic field in the reference plane P. The composite magnetic field of FIG. 16 is a composite of the target magnetic field shown in FIG. 15 and the noise magnetic field Mex. In FIG. 16, the strength of the noise magnetic field Mex is set at 1 mT, and the direction of the noise magnetic field Mex is a direction that is rotated by 60° from the X direction to the Y direction. In FIG. 16, the intersection point of the reference plane P and the center of rotation C (see FIG. 12) is set at an origin point. In FIG. 16, each axis is in units of mm. In FIG. 16, each arrow represents the strength and direction of the composite magnetic field when the rotating field angle θM is 0°. The length of the arrow represents the strength of the composite magnetic field, and the direction of the arrow represents the direction of the composite magnetic field.

Now, a description will be given of the relationship between the noise magnetic field Mex and the individual angle value $\theta s_n$ in the present embodiment. When the noise magnetic field Mex is absent, the individual angle value $\theta s_n$ is equal to the rotating field angle θM. However, when the noise magnetic field Mex is present, the direction of the composite magnetic field at the detection position $P_n$ may deviate from the direction of the target magnetic field at the detection position $P_n$ to cause the individual angle value $\theta s_n$ to differ from the value of the rotating field angle θM. The difference between the individual angle value $\theta s_n$ and the rotating field angle θM will hereinafter be referred to as the angular error of the individual angle value $\theta s_n$. The angular error of the individual angle value $\theta s_n$ is caused by the noise magnetic field Mex.

As mentioned previously, in the present embodiment, the target magnetic field has different strengths at least two of the plurality of detection positions $P_1$, $P_2$, . . . , and $P_N$. In the reference plane P, the strength of the target magnetic field varies depending on the distance from the center of rotation C. The different strengths of the target magnetic field at least two of the detection positions result in different relative effects of the noise magnetic field Mex on the composite magnetic field at those detection positions, thus causing a difference in the direction of the composite magnetic field at those detection positions. As a result, a difference occurs in the individual angle value $\theta s_n$.

Now, taking the composite magnetic field at the detection position $P_1$ and the composite magnetic field at the detection position $P_2$ as an example, the effects of the noise magnetic field Mex will be described. In the present embodiment, the reference sign MF1 is used to represent the composite magnetic field at the detection position $P_1$, and the reference sign MF2 is used to represent the composite magnetic field at the detection position $P_2$. The composite magnetic field MF1 will also be referred to as the first composite magnetic field MF1, and the composite magnetic field MF2 will also be referred to as the second composite magnetic field MF2. In the present embodiment, the reference sign MFa is used to represent the target magnetic field at the detection position $P_1$, and the reference sign MFb is used to represent the target magnetic field at the detection position $P_2$. The target magnetic field MFa will also be referred to as a first partial magnetic field MFa, and the target magnetic field MFb will also be referred to as a second partial magnetic field MFb. The direction of the first partial magnetic field MFa and the direction of the second partial magnetic field MFb are the same as the direction of the target magnetic field at the reference position.

Figure 17A:
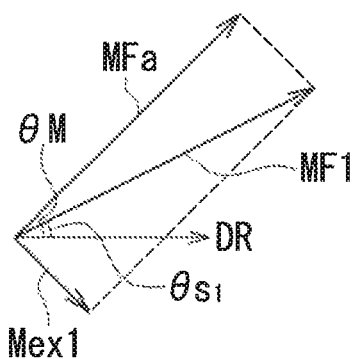
FIG. 17A is an explanatory diagram schematically illustrating the relationship between a first composite magnetic field and a noise magnetic field in the fourth embodiment of the invention.
Figure 17B:
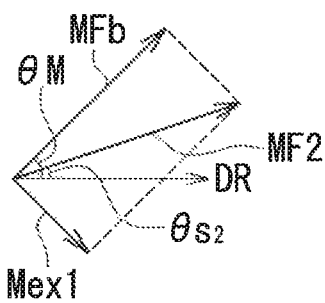
FIG. 17B is an explanatory diagram schematically illustrating the relationship between a second composite magnetic field and the noise magnetic field in the fourth embodiment of the invention.

Assume here two components of the noise magnetic field Mex: a first component orthogonal to the first and second partial magnetic fields MFa and MFb; and a second component parallel to the first and second partial magnetic fields MFa and MFb. FIG. 17A and FIG. 17B are explanatory diagrams schematically illustrating the relationship between the first and second composite magnetic fields MF1, MF2 and the noise magnetic field Mex. FIG. 17A illustrates the relationship between the first composite magnetic field MF1 and the first component of the noise magnetic field Mex. FIG. 17B illustrates the relationship between the second composite magnetic field MF2 and the first component of the noise magnetic field Mex. In each of FIG. 17A and FIG. 17B, the arrow labeled Mex1 represents the first component of the noise magnetic field Mex. In FIG. 17A and FIG. 17B the magnitude of the first component Mex1 is exaggerated. As shown in FIG. 17A and FIG. 17B, the directions of the first and second composite magnetic fields MF1 and MF2 deviate from the directions of the first and second partial magnetic fields MFa and MFb, respectively, due to the effect of the first component Mex1.

Assume that in the present embodiment, the strength of the noise magnetic field Mex is sufficiently smaller than the strengths of the first and second partial magnetic fields MFa and MFb to the extent that the second component of the noise magnetic field Mex has a negligible effect on the directional deviations of the first and second composite magnetic fields MF1 and MF2. In FIG. 17A and FIG. 17B, the first composite magnetic field MF1 is represented as a composite magnetic field of the first partial magnetic field MFa and the first component Mex1 of the noise magnetic field Mex, and the second composite magnetic field MF2 is represented as a composite magnetic field of the second partial magnetic field MFb and the first component Mex1 of the noise magnetic field Mex.

As shown in FIG. 17A, a deviation of the direction of the first composite magnetic field MF1 from the direction of the first partial magnetic field MFa causes an angular error of the individual angle value $\theta s_1$ generated on the basis of the first composite magnetic field MF1. The angular error of the individual angle value $\theta s_1$ is a $\tan(B_{ex}/B_1)$, where $B_1$ represents the strength of the first partial magnetic field MFa, and $B_{ex}$ represents the strength of the first component Mex1 of the noise magnetic field Mex.

As shown in FIG. 17B, a deviation of the direction of the second composite magnetic field MF2 from the direction of the second partial magnetic field MFb causes an angular error of the individual angle value $\theta s_2$. The angular error of the individual angle value $\theta s_2$ is a $\tan(B_{ex}/B_2)$, where $B_2$ represents the strength of the second partial magnetic field MFb.

When x is sufficiently small, a $\tan(x)$ can be approximated as AT·x. AT is a constant value, an example of which is 56.57. In the present embodiment, since the strength $B_{ex}$ of the first component Mex1 of the noise magnetic field Mex is sufficiently smaller than the strengths $B_1$ and $B_2$ of the first and second partial magnetic fields MFa and MFb, a $\tan(B_{ex}/B_1)$ can be approximated as AT·$(B_{ex}/B_1)$, and a $\tan(B_{ex}/B_2)$ can be approximated as AT·$(B_{ex}/B_2)$.

The individual angle value $\theta s_1$ is expressible by using the rotating field angle $\theta M$ and the angular error of the individual angle value $\theta s_1$. The individual angle value $\theta s_2$ is expressible by using the rotating field angle $\theta M$ and the angular error of the individual angle value $\theta s_2$. Specifically, the individual angle values $\theta s_1$ and $\theta s_2$ are expressible by the following Eqs. (18) and (19), respectively.

$$\theta s_1 = \theta M - AT \cdot (B_{ex}/B_1) \tag{18}$$

$$\theta s_2 = \theta M - AT \cdot (B_{ex}/B_2) \tag{19}$$

The foregoing description has been made with the composite magnetic fields at the detection positions $P_1$ and $P_2$ taken as an example. The foregoing description holds true for the composite magnetic field at the detection position $P_n$. The individual angle value $\theta s_n$ is expressible by Eq. (20) below. In Eq. (20), $B_n$ represents the strength of the target magnetic field at the detection position $P_n$. Note that the direction of the target magnetic field at the detection position $P_n$ is the same as the direction of the target magnetic field at the reference position.

$$\theta s_n = \theta M - AT \cdot (B_{ex}/B_n) \tag{20}$$

Now, a description will now be given of a generation method for the detected angle value $\theta s$ in the present embodiment. First, the generation method for the detected angle value $\theta s$ will be conceptually described. In the present embodiment, the angle computing unit 350 assumes a first unknown, a second unknown, and a plurality of pieces of assumed magnetic field information. The first unknown is a value corresponding to the detected angle value $\theta s$. The second unknown is a value corresponding to the strength of the noise magnetic field Mex. The plurality of pieces of assumed magnetic field information are information corresponding to the plurality of pieces of composite magnetic field information and assumed on the basis of the first and second unknowns.

The angle computing unit 350 estimates the first and second unknowns so as to minimize the sum of squares of differences between respective corresponding ones of the plurality of pieces of composite magnetic field information and the plurality of pieces of assumed magnetic field information, and determines the detected angle value $\theta s$ on the basis of the estimated first unknown.

The method of estimating the first and second unknowns is the same as the method of determining the first and second estimated values M and E described in relation to the first embodiment. To be more specific, the first and second unknowns are estimated by determining the column vector x by the method described in relation to the first embodiment using Eqs. (5) to (8). According to the present embodiment, in Eqs. (5) and (6), z represents an N-dimensional column vector containing N number of elements having correspondences with the plurality of pieces of assumed magnetic field information generated on the basis of the first and second unknowns to be obtained. In Eqs. (5) to (8), H is a matrix with N rows and two columns defined according to the relationship between the noise magnetic field Mex and the individual angle value $\theta s_n$. In Eqs. (5) to (7), x is a two-dimensional column vector whose elements are the first unknown and the second unknown. In Eqs. (6) to (8), y represents an N-dimensional column vector containing N number of elements having correspondences with the plurality of pieces of composite magnetic field information, i.e., N number of individual angle values $\theta s_1, \theta s_2, \ldots,$ and $\theta s_N$.

In the present embodiment, the detected angle value $\theta s$ is determined on the basis of the first unknown, which is one of the two elements of the column vector x calculated by substituting the matrix H and the column vector y into Eq. (8) of the first embodiment.

The generation method for the detected angle value $\theta s$ will now be concretely described. In the present embodiment, the angle computing unit 350 performs operations using real numbers. In the present embodiment, the number of the plurality of pieces of assumed magnetic field information is N. The N number of pieces of assumed magnetic field information are represented here by $z_1, z_2, \ldots,$ and $z_N$. The N number of pieces of assumed magnetic field information $z_1, z_2, \ldots,$ and $z_N$ are assumed on the basis of the first and second unknowns, and correspond to the individual angle values $\theta s_1, \theta s_2, \ldots,$ and $\theta s_N$, respectively. In the present embodiment, the N number of pieces of assumed magnetic field information are modeled by the following Eq. (21).

$$\begin{bmatrix} z_1 \\ z_2 \\ \vdots \\ z_N \end{bmatrix} = \begin{bmatrix} 1 & -\dfrac{AT}{B_1} \\ 1 & -\dfrac{AT}{B_2} \\ \vdots & \vdots \\ 1 & -\dfrac{AT}{B_N} \end{bmatrix} \begin{bmatrix} \theta MA \\ B_{ex} \end{bmatrix} \tag{21}$$

The N-dimensional column vector on the left side of Eq. (21) corresponds to z of Eq. (5).

The two-dimensional column vector on the right side of Eq. (21) corresponds to x of Eq. (5). This column vector is hereinafter represented by $x_e$. Assume that in the present embodiment, the rotating field angle $\theta M$ is the same as the angle to be detected. In the present embodiment, the first unknown is an unknown corresponding to the rotating field angle $\theta M$, and represented by $\theta MA$. Since the rotating field angle $\theta M$ is the same as the angle to be detected as mentioned above, the first unknown $\theta MA$ is a value corresponding to the detected angle value $\theta s$. In the present embodiment, the second unknown is an unknown corresponding to the strength $B_{ex}$ of the first component Mex1 of the noise magnetic field Mex. Although the second unknown is not the strength $B_{ex}$ itself, the second unknown is represented by $B_{ex}$ for the sake of convenience in Eq. (21) and the following description.

The matrix with N rows and two columns on the right side of Eq. (21) corresponds to H of Eq. (5). This matrix is hereinafter represented by $H_e$. The elements of the matrix $H_e$ are defined according to the relationship between the noise magnetic field Mex and the individual angle value $\theta s_n$. The relationship between the noise magnetic field Mex and the individual angle value $\theta s_n$ is expressible using the rotating field angle $\theta M$ and the strength $B_{ex}$, as in Eq. (20). In the present embodiment, the N number of elements of the first column of the matrix $H_e$ are defined on the basis of the coefficient of $\theta M$ of Eq. (20). To be more specific, as indicated by Eq. (21), all of the N number of elements of the first column of the matrix $H_e$ are set at 1. In the present embodiment, the N number of elements of the second column of the matrix $H_e$ are defined on the basis of the coefficient of $B_{ex}$ of Eq. (20). To be more specific, as indicated by Eq. (21), the N number of elements of the second column of the matrix $H_e$ are set at $-AT/B_1$, $-AT/B_2$, ..., and $-AT/B_N$. $B_1$, $B_2$, ..., and $B_N$ are obtained by, for example, measuring the strength of the target magnetic field at each of the plurality of detection positions $P_1$, $P_2$, ..., and $P_N$ under the condition where the noise magnetic field Mex is absent.

Here, let $y_e$ represent an N-dimensional column vector containing N number of individual angle values $\theta s_1$, $\theta s_2$, ..., and $\theta s_N$ as its elements. The column vector $y_e$ is expressed by the following Eq. (22).

$$y_e^T = [\theta s_1, \theta s_2, \ldots, \theta s_N] \quad (22)$$

The angle computing unit 350 calculates $x_e$ by replacing H, x, and y in Eq. (8) with $H_e$, $x_e$, and $y_e$, respectively. The first unknown $\theta MA$ and the second unknown $B_{ex}$ are thereby estimated.

The angle computing unit 350 determines the detected angle value $\theta s$ on the basis of the estimated first unknown $\theta MA$. To be more specific, the angle computing unit 350 uses the estimated first unknown $\theta MA$ as the detected angle value $\theta s$.

In the present embodiment, the detected angle value $\theta s$ is determined without using information on the strength of the composite magnetic field. The present embodiment thus enables accurate determination of the detected angle value $\theta s$ even in the case where the magnitudes of the first and second signals $S1_n$ and $S2_n$ are saturated depending on the strength of the composite magnetic field.

In the present embodiment, $B_1$, $B_2$, ..., $B_N$ of Eq. (21) may be in arbitrary units. In other words, $B_1$, $B_2$, ..., $B_N$ may be any values as long as the relationship of the ratio therebetween is the same as the relationship of the ratio between the strengths of the target magnetic field at the detection positions $P_1$, $P_2$, ..., and $P_N$. In Eq. (21), AT may be any constant other than 56.57. When $B_1$, $B_2$, ..., $B_N$ are in other units or the value of AT is different, the value of the estimated second unknown $B_{ex}$ becomes different. Even in such a case, since the value of the estimated second unknown $B_{ex}$ varies in accordance with the strength of the noise magnetic field Mex, the second unknown $B_{ex}$ can be said to be a value corresponding to the strength of the noise magnetic field Mex. This means that the second unknown $B_{ex}$ may be in arbitrary units. Even when $B_1$, $B_2$, ..., $B_N$ are in other units or the value of AT is different, the value of the estimated first unknown $\theta MA$ is unchanged.

The effects of the present embodiment will now be described with reference to simulation results. The simulation obtained the angular error of the individual angle value $\theta s_n$ and the angular error of the detected angle value $\theta s$ when the detected angle value $\theta s$ was generated in the presence of a noise magnetic field Mex having a constant direction and strength. The simulation used the reference angle $\theta r$, which corresponds to a true angle to be detected, to obtain the angular errors. To be more specific, the difference between the individual angle value $\theta s_n$ and the reference angle $\theta r$ was assumed to be the angular error of the individual angle value $\theta s_n$, and the difference between the detected angle value $\theta s$ and the reference angle $\theta r$ was assumed to be the angular error of the detected angle value $\theta s$.

Figure 18:
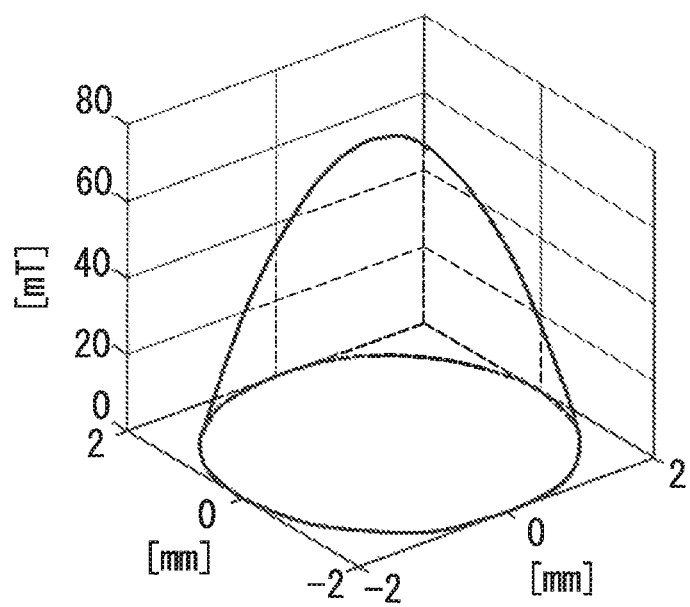
FIG. 18 is an explanatory diagram schematically illustrating the distribution of the strength of a magnetic field to be detected generated by the magnetic field generation unit in a simulation of the fourth embodiment of the invention.

In the simulation, a magnetic field whose strength decreases with increasing distance from the center of rotation C (see FIG. 12) in the reference plane P was assumed as the target magnetic field generated by the magnetic field generation unit 5, as with the target magnetic field shown in FIG. 15. FIG. 18 is an explanatory diagram schematically illustrating the distribution of the strength of the target magnetic field. In FIG. 18, the vertical axis represents the strength of the target magnetic field (in units of mT). In FIG. 18, two axes orthogonal to the vertical axis represent positions (in units of mm) in two orthogonal directions in the reference plane P. In FIG. 18, an intersection point of the reference plane P and the center of rotation C (see FIG. 12) is set at an origin point of the two axes orthogonal to the vertical axis. The strength of the target magnetic field at the origin point was set at 80 mT, and the strength of the noise magnetic field Mex was set at 4 mT.

In the simulation, an error generated by a random number was superimposed on the target magnetic field. The difference between the maximum value and the minimum value of this error was set at 6 mT. This error is assumed to be a normal error generated in the angle sensor 1. The normal error includes an error owing to the nonlinearity of the plurality of composite magnetic field information generation units and an error owing to white noise. An angular error caused by the normal error is sufficiently smaller than an angular error caused by the noise magnetic field Mex.

Figure 19:
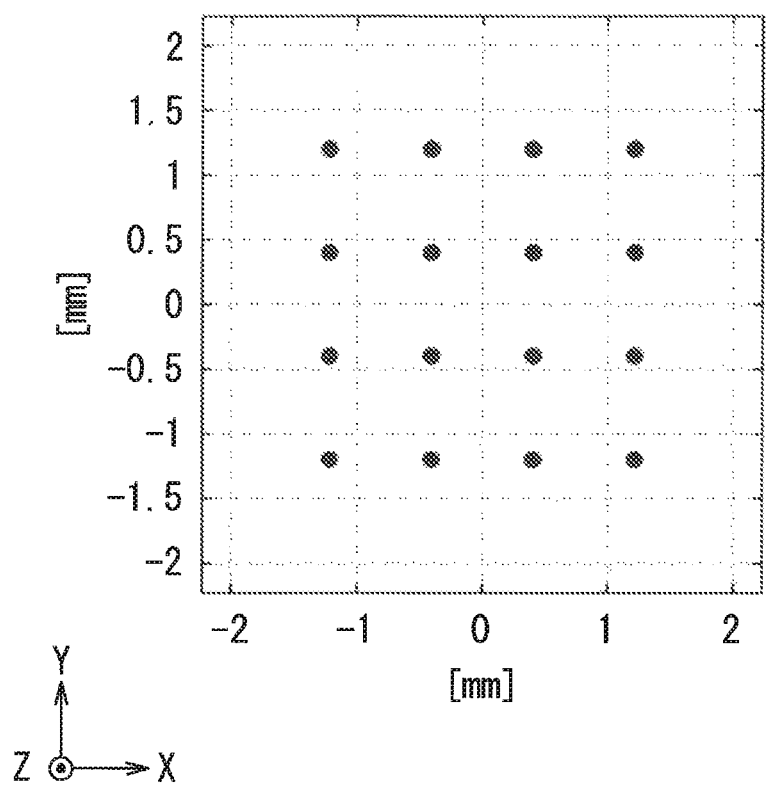
FIG. 19 is an explanatory diagram illustrating a plurality of detection positions in the simulation of the fourth embodiment of the invention.

In the simulation, the number of the detection positions was 16. FIG. 19 is an explanatory diagram illustrating the detection positions in the simulation. In FIG. 19, black dots indicate the detection positions. In the simulation, the detection positions were arranged at regular intervals in the X direction and the Y direction. The intervals between every two detection positions adjacent to each other in the X direction and the intervals between every two detection positions adjacent to each other in the Y direction were each 0.8 mm.

Figure 20:
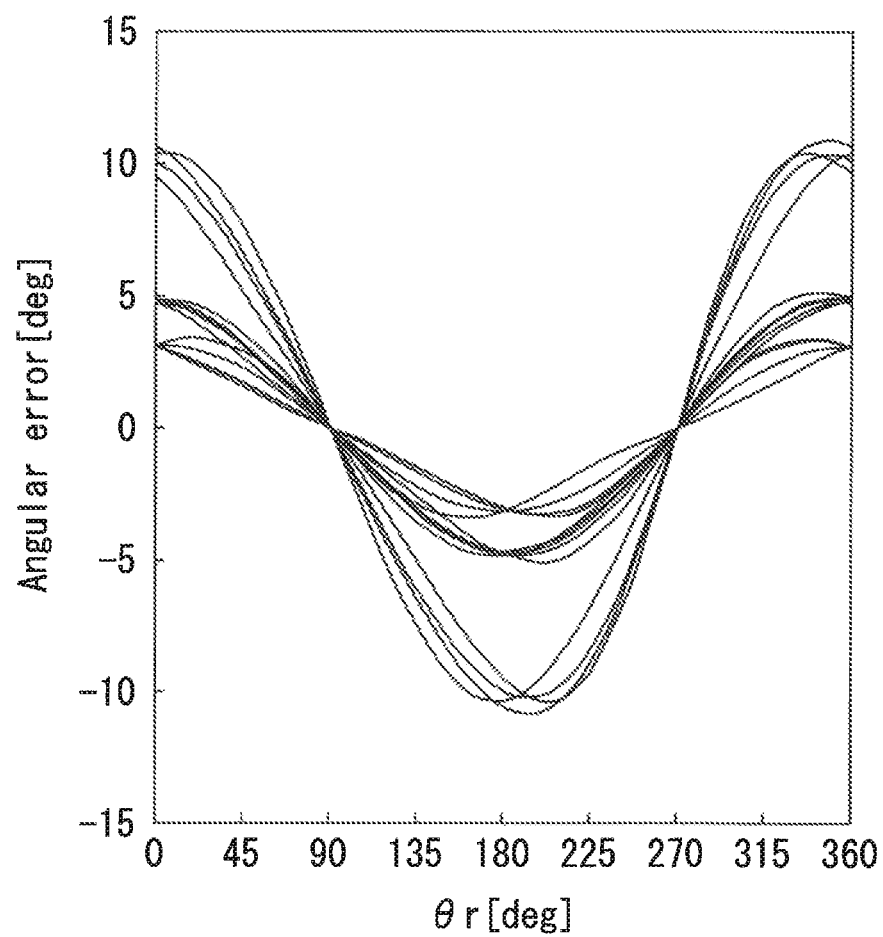
FIG. 20 is a waveform diagram illustrating an example of waveforms of angular errors of individual detection angles in the fourth embodiment of the invention.

FIG. 20 illustrates an example of waveforms of sixteen angular errors of the individual angle values $\theta s_1$ to $\theta s_{16}$ obtained in the simulation. In FIG. 20, the horizontal axis represents the reference angle $\theta r$, and the vertical axis represents angular error. The differences in amplitude between the waveforms of the sixteen angular errors shown in FIG. 20 result from different relative effects of the noise magnetic field Mex on the composite magnetic field at the respective detection positions. The relative effect of the noise magnetic field Mex increases with increasing distance between the detection position $P_n$ and the center of rotation C. Therefore, the amplitude of the angular error increases with increasing distance between the detection position $P_n$ and the center of rotation C.

Figure 21:
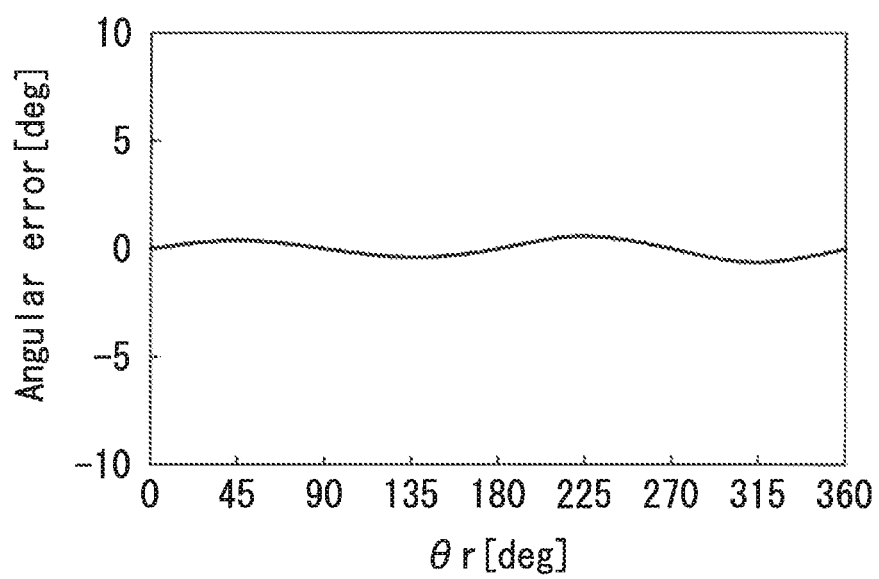
FIG. 21 is a waveform diagram illustrating an example of the waveform of the angular error of the detected angle value in the fourth embodiment of the invention.

FIG. 21 illustrates an example of the waveform of the angular error of the detected angle value $\theta s$ obtained in the simulation. In FIG. 21 the horizontal axis represents the reference angle $\theta r$, and the vertical axis represents angular error. As shown in FIG. 21, the angular error of the detected angle value $\theta s$ is sufficiently smaller than any of the sixteen angular errors of the individual angle values $\theta s_1$ to $\theta s_{16}$ shown in FIG. 20. The sixteen angular errors of the individual angle values $\theta s_1$ to $\theta s_{16}$ are mainly attributable to the noise magnetic field Mex. On the other hand, the angular error of the detected angle value $\theta s$ is mainly attributable to the normal error. Thus, the present embodiment enables reduction of angular errors caused by the noise magnetic field Mex.

The plurality of detection positions in the present embodiment may be mutually different positions on an imaginary straight line passing through the magnetic field generation unit 5, like the first to fourth detection positions P1 to P4 of the first embodiment. In such a case, the target magnetic field has different strengths at the plurality of detection positions. The other configuration, function and effects of the fourth embodiment are the same as those of the first or second embodiment.

The present invention is not limited to the foregoing embodiments, and various modifications may be made thereto. For example, each of the plurality of composite magnetic field information generation units in the present invention may include a part that generates information on only the direction of the composite magnetic field in the same manner as the first to fourth composite magnetic field information generation units 10, 20, 30 and 40 of the first embodiment, and another part that generates information on only the strength of the composite magnetic field.

In the case where the angular error caused by the noise magnetic field falls within an allowable range even if information on the strength of the composite magnetic field included in each piece of composite magnetic field information is set at a predetermined constant value, the information on the strength of the composite magnetic field included in each piece of composite magnetic field information may be set at the constant value. In such a case, each composite magnetic field information generation unit may generate composite magnetic field information that includes information on an actually detected direction of the composite magnetic field and also includes the aforementioned information on the strength of the constant value, which is not information on an actually detected strength of the composite magnetic field.

In the present invention, the variation in strength of the target magnetic field according to the angle to be detected may exhibit different patterns at the plurality of detection positions. In such a case, by modeling the plurality of pieces of estimated composite magnetic field information in consideration of the variation patterns of the strength of the target magnetic field at the plurality of detection positions, it is possible to estimate the detected angle value $\theta s$ with the effect of the noise magnetic field Mex eliminated, as in the second embodiment. An example of the cases where the variation in strength of the target magnetic field according to the angle to be detected exhibits different patterns at the plurality of detection positions is where the magnet 6 rotates in an eccentric manner in the second embodiment.

In the present invention, the pattern of variation in the direction of the target magnetic field according to the angle to be detected and also the strength of the target magnetic field or the pattern of variation in the strength of the target magnetic field may be different between the plurality of detection positions. In such a case, modeling the plurality of pieces of estimated composite magnetic field information in consideration of the strengths of the target magnetic field or the variation patterns of the strength of the target magnetic field and also the variation patterns of the direction of the target magnetic field at the plurality of detection positions makes it possible to estimate the detected angle value $\theta s$ with the effect of the noise magnetic field Mex eliminated.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. An angle sensor for generating a detected angle value having a correspondence with an angle to be detected, comprising:
   a plurality of composite magnetic field information generation units for detecting, at a plurality of detection positions different from each other, a composite magnetic field which is a combination of a magnetic field to be detected and a noise magnetic field other than the magnetic field to be detected, the magnetic field to be detected being generated by a magnetic field generation unit located away from the plurality of detection positions, and thereby generating a plurality of pieces of composite magnetic field information including information on at least a direction, out of the direction and a strength, of the composite magnetic field, at each of the plurality of detection positions, the magnetic field to be detected varying in direction according to the angle to be detected; and
   an angle computing unit configured to:
      define a function that minimizes a sum of squares of differences between respective corresponding ones of the plurality of pieces of composite magnetic field information and a plurality of pieces of estimated composite magnetic field information, and that calculates a first calculated value and a second calculated value the first calculated value corresponding to the angle to be detected, the second calculated value corresponding to the noise magnetic field, the plurality of pieces of estimated composite magnetic field information being estimated information of the plurality of pieces of composite magnetic field information generated based on the first and second calculated values;
      determine the first calculated value and the second calculated value based on the plurality of pieces of composite magnetic field information and the function; and
      generate the detected angle value based on the first calculated value.

2. The angle sensor according to claim 1, wherein each of the plurality of composite magnetic field information generation units includes two detection signal generation units for generating two detection signals indicative of strengths of two components of the composite magnetic field that are in mutually different directions, and each of the plurality of pieces of composite magnetic field information is generated based on the two detection signals.

3. The angle sensor according to claim 2, wherein the two components of the composite magnetic field are in mutually orthogonal directions.

4. The angle sensor according to claim 2, wherein each of the two detection signal generation units includes at least one magnetic detection element.

5. The angle sensor according to claim 1, wherein
   each of the plurality of pieces of composite magnetic field information includes information on the direction and strength of the composite magnetic field, the first calculated value includes direction information corresponding to the detected angle value, and magnitude information corresponding to the strength of the magnetic field to be detected at a predetermined position, and the second calculated value includes direction information corresponding to the direction of the noise magnetic field, and magnitude information corresponding to the strength of the noise magnetic field.

6. The angle sensor according to claim 1, wherein the magnetic field to be detected has different strengths at the plurality of detection positions.

7. The angle sensor according to claim 1, wherein the variation in direction of the magnetic field to be detected according to the angle to be detected exhibits different patterns at the plurality of detection positions.

8. An angle sensor system comprising:
the angle sensor according to claim 1; and
the magnetic field generation unit for generating the magnetic field to be detected.

9. The angle sensor system according to claim 8, wherein
the plurality of detection positions are at different distances from the magnetic field generation unit, and
the magnetic field to be detected has different strengths at the plurality of detection positions.

10. The angle sensor system according to claim 9, wherein the plurality of detection positions are mutually different positions on an imaginary straight line passing through the magnetic field generation unit.

11. The angle sensor system according to claim 8, wherein the plurality of detection positions are in one plane.

12. The angle sensor system according to claim 11, wherein the variation in direction of the magnetic field to be detected according to the angle to be detected exhibits different patterns at the plurality of detection positions.

13. The angle sensor system according to claim 11, wherein the magnetic field to be detected has different strengths at at least two of the plurality of detection positions.

14. An angle sensor for generating a detected angle value having a correspondence with an angle to be detected, comprising:
a plurality of composite magnetic field information generation units for detecting, at a plurality of detection positions different from each other, a composite magnetic field which is a combination of a magnetic field to be detected and a noise magnetic field other than the magnetic field to be detected, the magnetic field to be detected being generated by a magnetic field generation unit located away from the plurality of detection positions, and thereby generating a plurality of pieces of composite magnetic field information including information on at least a direction, out of the direction and a strength, of the composite magnetic field, at each of the plurality of detection positions, the magnetic field to be detected varying in direction according to the angle to be detected, each of the plurality of pieces of composite magnetic field information including information on the direction of the composite magnetic field; and an angle computing unit configured to:
define a function that minimizes a sum of squares of differences between respective corresponding ones of the plurality of pieces of composite magnetic field information and a plurality of pieces of assumed magnetic field information, and that calculates a first unknown and a second unknown, the first unknown being a value corresponding to the detected angle value, the second unknown being a value corresponding to the strength of the noise magnetic field, the plurality of pieces of assumed magnetic field information being information corresponding to the plurality of pieces of composite magnetic field information and assumed based on the first and second unknowns;
estimate the first and second unknowns based on the plurality of pieces of composite magnetic field information and the function;
determine the detected angle value based on the estimated first unknown; and
generate the detected angle value.

15. The angle sensor according to claim 14, wherein each of the plurality of composite magnetic field information generation units includes:
a first signal generation unit for generating a first signal having a correspondence with a cosine of an angle that the direction of the composite magnetic field forms with respect to a reference direction;
a second signal generation unit for generating a second signal having a correspondence with a sine of the angle that the direction of the composite magnetic field forms with respect to the reference direction; and
an individual angle computing unit for generating, based on the first and second signals, an individual angle value as the composite magnetic field information, the individual angle value representing the angle that the direction of the composite magnetic field forms with respect to the reference direction.

16. The angle sensor according to claim 15, wherein each of the first and second signal generation units includes at least one magnetic detection element.

17. The angle sensor according to claim 14, wherein the magnetic field to be detected has different strengths at at least two of the plurality of detection positions.

* * * * *